(12) United States Patent
Hiroe

(10) Patent No.: US 9,361,907 B2
(45) Date of Patent: Jun. 7, 2016

(54) SOUND SIGNAL PROCESSING APPARATUS, SOUND SIGNAL PROCESSING METHOD, AND PROGRAM

(75) Inventor: Atsuo Hiroe, Kanagawa (JP)

(73) Assignee: Sony Corporation, Tokyo (JP)

(*) Notice: Subject to any disclaimer, the term of this patent is extended or adjusted under 35 U.S.C. 154(b) by 606 days.

(21) Appl. No.: 13/348,260

(22) Filed: Jan. 11, 2012

(65) Prior Publication Data

US 2012/0183149 A1     Jul. 19, 2012

(30) Foreign Application Priority Data

Jan. 18, 2011  (JP) ................. 2011-008208

(51) Int. Cl.
| | |
|---|---|
| H04R 29/00 | (2006.01) |
| G10L 25/48 | (2013.01) |
| G01S 3/808 | (2006.01) |
| G10L 25/78 | (2013.01) |
| G10L 21/0216 | (2013.01) |

(52) U.S. Cl.
CPC .............. *G10L 25/48* (2013.01); *G01S 3/8083* (2013.01); *G10L 25/78* (2013.01); *G10L 2021/02166* (2013.01)

(58) Field of Classification Search
CPC ..... G10L 21/0208; G10L 25/48; G10L 25/78; G10L 2021/02166; G01S 3/8083; H04R 3/005; H04R 2225/43
USPC ........... 381/17, 66, 74, 91, 92, 93, 94.1, 94.2, 381/94.3, 26, 83, 119; 704/225, 216, 217, 704/233; 367/124, 125
See application file for complete search history.

(56) References Cited

U.S. PATENT DOCUMENTS

| | | |
|---|---|---|
| 5,999,800 A | 12/1999 | Choi et al. |
| 6,449,216 B1 | 9/2002 | Roeck |
| 7,908,137 B2 | 3/2011 | Honda |
| 8,218,093 B2 * | 7/2012 | Kondo .................. G08C 17/02 340/4.11 |
| 2005/0047611 A1 * | 3/2005 | Mao ..................... G10L 21/0208 381/94.7 |
| 2005/0213793 A1 * | 9/2005 | Oya ..................... G06K 9/00711 382/103 |
| 2008/0077400 A1 | 3/2008 | Yamamoto et al. |
| 2008/0130914 A1 * | 6/2008 | Cho ..................... G10L 21/0208 381/94.1 |
| 2008/0232607 A1 * | 9/2008 | Tashev ..................... G01S 3/86 381/71.11 |
| 2011/0014981 A1 * | 1/2011 | Mao ....................... H04R 3/005 463/36 |

FOREIGN PATENT DOCUMENTS

| | | |
|---|---|---|
| JP | 34-2385 | 4/1959 |
| JP | 10-41733 | 2/1998 |
| JP | 2001-305202 | 10/2001 |
| JP | 2003-258770 | 9/2003 |

(Continued)

OTHER PUBLICATIONS

Office action issued Sep. 2, 2014 in Japanese patent Application No. 2011-008208 (with English translation).

Ryuhei Takahashi et al, "A Signal Number Detection Method by Noise Eigenvalue-based Adaptive Thresholds", The Institute of Electronics, Information and Communication Engineers, IEICE Technical Report, vol. 108, No. 304, Nov. 12, 2008, pp. 127-132 (with English abstract).

(Continued)

*Primary Examiner* — Vivian Chin
*Assistant Examiner* — William A Jerez Lora
(74) *Attorney, Agent, or Firm* — Chip Law Group

(57) ABSTRACT

An apparatus including a direction estimation unit detecting one or more direction points indicating a sound source direction of a sound signal for each of blocks divided in a predetermined time unit, and a direction tracking unit connecting the direction points to each other between the blocks and detecting a section in which a sound is active.

10 Claims, 23 Drawing Sheets

(56) References Cited

FOREIGN PATENT DOCUMENTS

| JP | 2003-529045 | 9/2003 |
|---|---|---|
| JP | 2008-175733 | 7/2008 |
| JP | 4182444 | 9/2008 |
| JP | 2008-249702 | 10/2008 |
| JP | 4282704 | 3/2009 |
| JP | 2010-121975 | 6/2010 |

OTHER PUBLICATIONS

Nobuyoshi Kikuma, "Iterative DOA Estimation Using Subspace Tracking Methods and Adaptive Beamforming", The Institute of Electronics, Information, and Communication Engineers, Sep. 1, 2004, J87-B(9), pp. 1149-1161(with English abstract).

* cited by examiner

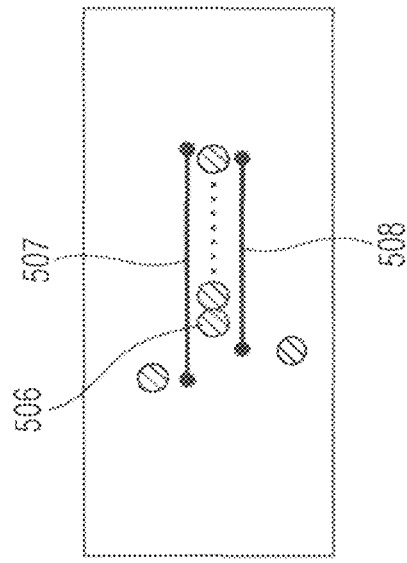
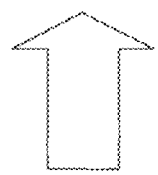
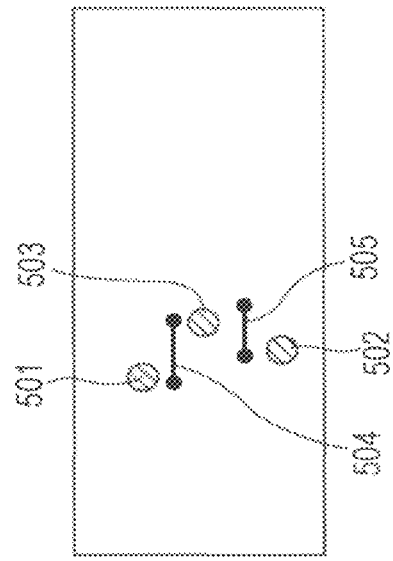

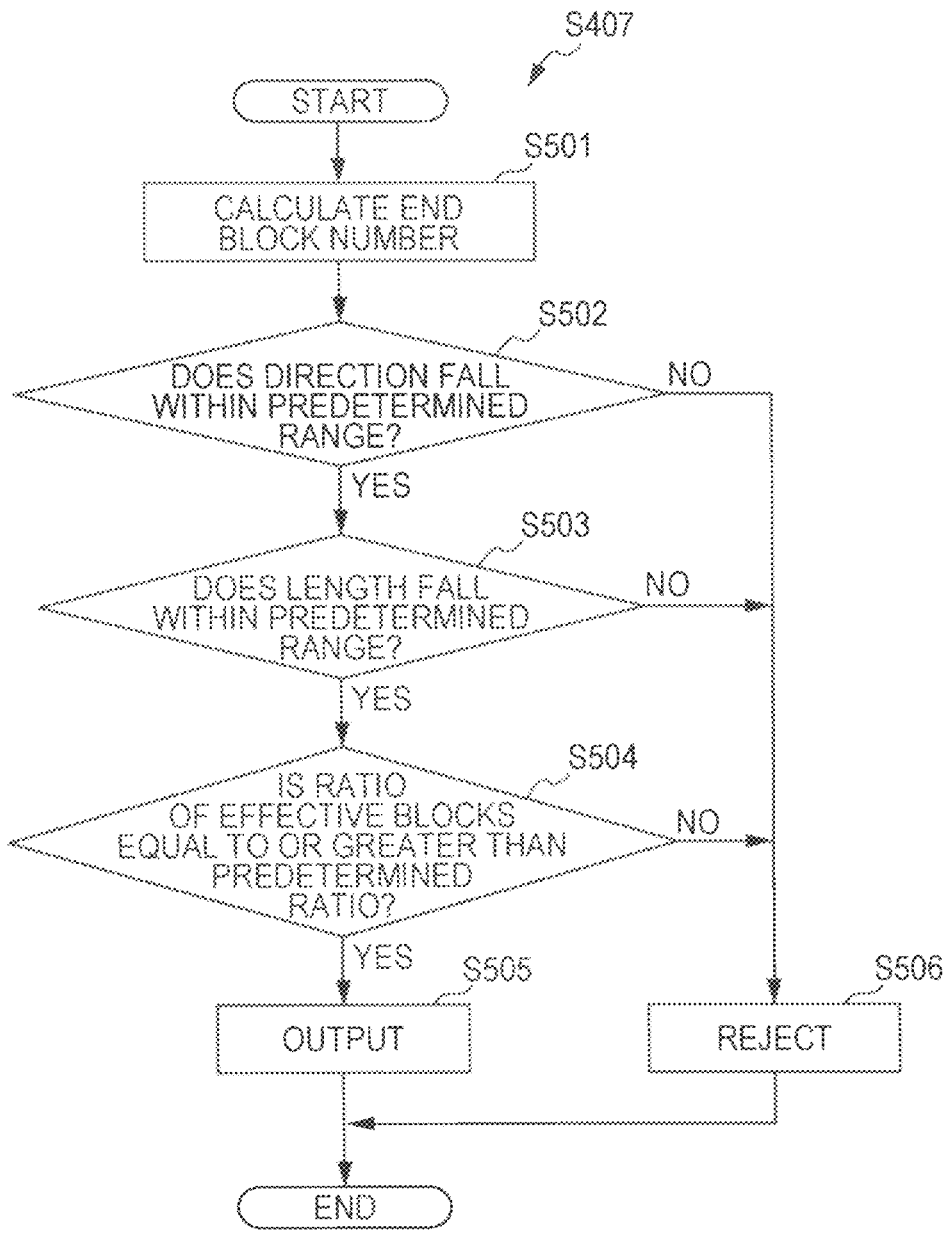

SOUND SIGNAL PROCESSING APPARATUS, SOUND SIGNAL PROCESSING METHOD, AND PROGRAM

BACKGROUND

The present technique relates to a sound signal processing apparatus, a sound signal processing method, and a program, and more particularly, to a sound signal processing apparatus, a sound signal processing method, and a program capable of executing a speech section detection process accompanied with sound source direction estimation.

Hereinafter, as techniques according to the related art, speech section detection will be first described on the whole and a method of processing speech section detection using sound source direction estimation will be subsequently described.

The speech section detection (SD: Speech Detection) refers to a process of cutting a section in which a person utters in a sound signal input via a microphone included in, for example, a sound signal processing apparatus. The speech section detection (SD) is also referred to as VAD (Voice Activity Detection).

In the specification, a process of cutting out the utterance section of a person from a sound signal will be described as "speech section detection" or simply "section detection." Further, a "section" is not limited to a section for speech, but may indicate a section in which a given sound source continues to be active (continues to generate sound).

The speech section detection is sometimes used along with speech recognition, sound source extraction, or the like. However, in either case, high accuracy is necessary in the section detection.

For example, since processing such as matching on the section cut out by the section detection is executed in many sound recognition devices, the accuracy of the section detection has a great influence on the accuracy of speech recognition. That is, when there is a difference between the actually uttered section and the section detected by a section detector, the difference may cause erroneous recognition.

On the other hand, in the sound source extraction, the section detection is sometimes used. For example, when a clear voice is desired to be extracted from a signal in which voice and noise are mixed with each other or when the voice of one person is desired to be extracted in an environment in which two or more persons utter simultaneously, it is necessary to divide an input signal into a section, in which only the noise is generated, and a section, in which both the voice and noise are generated, in accordance with a method of extracting sound sources. Therefore, in order to divide the input signal into these sections, section detection is used.

The section detection may sometimes be used in order to reduce a calculation amount or preventing the adoption to a silent section by extracting the sound source only when a target voice is present alone. In the speech section detection used along with the sound source extraction, it is necessary to operate with high accuracy even in an input signal in which voice and noise are mixed with each other or in which voices are mixed with each other.

In order to meet the above-mentioned uses, various suggestions have been made to improve the accuracy in the speech section detection. Here, focusing the number of microphones to be used, the suggestions are classified into the following two methods.

(1) Method of Using Single Microphone

This method is a method of extracting a feature indicating "voice likeness" from the input signal and executing the section detection based on the value.

This process is disclosed in, for example, Japanese Patent No. 4182444.

(2) Method of Using Plurality of Microphones

This method is a method of executing the section detection using the directions of sound sources.

This process is disclosed in, for example, Japanese Patent No. 4282704 and Japanese Unexamined Patent Application Publication No. 2010-121975.

The technique disclosed in the present specification uses method (2) above, that is, the method of using the plurality of microphones. Therefore, hereinafter, the overview of a method of using a sound source direction of the method (2) will be described.

The fundamental idea of the speech section detection based on the sound source direction is as follows.

Sounds generated from the same sound source arrive in the same direction viewed from a microphone. Therefore, the direction of arrival (DOA) of the sound source is estimated at a predetermined time interval, a section in which the sounds in the same direction continue to be generated is calculated, and the section is determined as a section in which the sound source is active (the sound is generated from the sound source). When this process is executed on the utterance of a human being, a speech section is detected.

Hereinafter, the direction of arrival (DOA) from the sound source is also simply referred to as a "sound source direction."

When the method of estimating the sound source direction is applied to each of the plurality of sound sources, a section can be calculated for each sound source in spite of the fact that the plurality of sound sources are simultaneously active (for example, even when the voices of a plurality of persons are overwritten).

For example, in the case where immediately before the end of the utterance from a person, another person starts to utter, a long region in which both the utterances are connected to each other is detected as one section in the method of using the "voice likeness", whereas respective sections of the utterances can be distinguished from each other and can be detected in the method of estimating the direction.

The overview of the method of detecting the speech section using the sound source direction estimation will be described with reference to FIGS. 1A to 1D.

FIG. 1A is a diagram illustrating an image of an input signal (or also referred to as an "observation signal"). Two persons utter "Hello" and "Good-by", respectively.

As shown in FIG. 1B, the input signal is divided into blocks with a predetermined length.

A block 11 shown in FIG. 1B indicates one of the divided blocks. The length of the block has a sufficiently short value in comparison to the length of a normal utterance. For example, the length is set to 1/10 seconds or 1/8 seconds.

The estimation of the sound source direction is executed on each block.

FIG. 1C shows the estimation result. The horizontal axis represents a time and the vertical axis represents a direction. The direction refers to an angle (see FIG. 2) of the sound source direction with respect to a microphone into which voice is input.

The points shown in FIG. 1C are direction points 12. The direction points indicate the sound source directions calculated inside each block.

Hereinafter, a point corresponding to the sound source direction is referred to as a "direction point." When a direction estimation method for a plurality of sound sources is used, each block can have a plurality of direction points.

Next, the direction points in the nearly identical direction are connected between the blocks. This process is referred to as tacking.

FIG. 1D shows the tracking result, that is, the connected direction points.

Lines 15 and 16 shown in FIG. 1D indicate a section in which each sound source is active, that is, a section of voice utterance.

As a method of calculating the sound source direction in each block, for example, Japanese Patent No. 4282704 described above discloses a process of using a "beamformer suppressing a signal arriving from an object sound source."

Further, Japanese Unexamined Patent Application Publication No. 2010-121975 described above discloses a process of using a MUSIC method.

In each process, basically, a spatial filter in which a null beam is directed in the direction of a sound source is generated and the direction of the null beam is set as the sound source direction. Hereinafter, the MUSIC method will be described.

The MUSIC method is an abbreviation of MUltiple SIgnal Classification. The MUSIC method can be explained as the following two steps (S1) and (S2) from the viewpoint of space filtering (process of transmitting or suppressing a sound in a specific direction). The details of the MUSIC method are described in Japanese Unexamined Patent Application Publication No. 2008-175733 or the like.

(S1) A spatial filter is generated such that a null beam is directed in the directions of all the sound sources generating voices within a given section (block).

(S2) A directivity characteristic (relationship between a direction and a gain) is investigated for the filter and the direction in which the null beam is formed is calculated.

The method of generating the spatial filter in step (S1) between step (S1) and step (S2) described above will be described later. First, the process of step (S2) will be described below.

FIG. 2 is a diagram illustrating a recording environment of the observation signals used to generate the spatial filter (FIG. 3) in which a null beam is directed in the sound source direction. Four microphones 22 and two sound sources (both human voices) are present. Further, the sound source direction is the direction of arrival viewed from a center 21 of the array of the microphones 22. When 0° is set in a vertical direction 24 with respect to an array direction 23 parallel to the array of the microphones, the counterclockwise direction is a positive (+) direction and the clockwise direction is a negative (−) direction.

FIG. 3 is a diagram illustrating the directivity characteristic of the spatial filter in which the null beam is directed in the sound source direction, that is, a plotted relationship between a direction (horizontal axis) and a gain (vertical axis). The vertical axis is expressed by logarithm. A method of generating directivity characteristic plot will be described later. Hereinafter, the spatial filter in which the null beam is directed in the sound source is referred to as a "null beam forming filter" and the plot of the directivity characteristic of this filter is referred to as a "null beam forming pattern."

A portion in which the gain sharply falls in the null beam forming pattern 31 shown in FIG. 3 expresses a direction in which sensitivity is low, that is, a null beam. In the drawing, a deep "valley" is present in a vicinity 32 of a direction=−24° and a vicinity 33 of a direction=+12°. The valleys indicate the null beams corresponding to a sound source 1, 25 and a sound source 2, 26 in FIG. 2.

That is, a direction θ1 of the sound source 1 is about −24° and a direction θ2 of the sound source 2 is about +12°. In other words, the blocks corresponding to the null beam forming pattern have direction points of −24° and +12°, respectively.

In the MUSIC method, the inverse number of the gain may be used instead of the logarithm of the gain. For example, the inverse number is used in Japanese Unexamined Patent Application Publication No. 2008-175733 described above. In this case, the null beam is expressed as a sharp "mountain" on a graph. Here, a method of using the logarithm of the gain will be described in comparison to the present technique.

When the direction point of each block is calculated in this way, the direction points having the similar value are connected to each other between the blocks. For example, when the direction points having the value close to the direction=−24° are connected to each other in the environment shown in FIG. 2, the human utterance section corresponding to the sound source 1, 25 shown in FIG. 2 is calculated. When the direction points having the value close to the direction=+12° are connected to each other, the human utterance section corresponding to the sound source 2, 26 is calculated.

Problems of Technique According to Related Art

Next, problems with the techniques according to the related art disclosing the speech section detection based on the sound source direction estimation will be described.

In the section detection based on the sound source direction estimation described above, it is preferable that the number of direction points detected as the direction points in the respective blocks described with reference to FIGS. 1A to 1D is identical to the number of sound sources actually generating voice.

If the number of direction points is less than the number of sound sources, a detection failure (voice is generated, but is not detected) may be caused. On the contrary, if the number of direction points detected is greater than the number of sound sources, erroneous detection (voice is not generated, but is detected) may be caused.

However, in the direction estimation in accordance with the MUSIC method, a problem may arise in that it is difficult to determine whether a concave (hereinafter, also referred to as a "local minimum") of the null beam forming pattern correspond to a null beam.

For example, the null beam forming pattern 31 shown in FIG. 3 has local minimums 34 to 37 with a shallow concave in addition to the deep concaves of the local minimum 32 near the direction=−24° and the local minimum 33 near the direction=+12°. Since the depths of the valleys corresponding to the null beams are different depending on the environment and are different depending on the blocks even under the same environment, it is difficult to determine whether a valley is the null beam based on a threshold value of the depth of the valley.

For example, in FIG. 3, it is possible to determine whether a valley is the null beam by setting a threshold 38 near the gain value≈−0.13. However, this threshold value is not guaranteed to be effective in other blocks.

Further, on the assumption that n is the number of microphones used to input voices, the maximum n−1 null beams can be formed. Based on this characteristic, the candidates for the sound source directions can be restricted to n−1, for example, by executing a process of sorting the rank order from the smaller maximum value in the null beam forming pattern 31 shown in FIG. 3 and selecting only the first to (n−1)-th maximum values.

However, when n−1 null beams are normally selected based on the number of microphones=n, n−1 direction points may be detected among the minute concaves of the null beam forming pattern even in silent voice. Accordingly, another condition is necessary in order to exclude the unnecessary direction point which does not corresponding to the sound source.

Further, there is a unique problem which may arise when the sound source direction estimation is used in the section detection. The section detectors corresponding to the plurality of sound sources preferably detect the sections without dependency on the number of simultaneously active sound sources. However, there is a case where this detection is difficult in the method of determining the null beams based on the threshold value.

A problem arising when the number of sound sources during utterance is changed will be described with reference to FIGS. 4A to 4C. It is assumed that the sound source 1, utters short while the sound source 2, 26 utter long in FIG. 2. In this case, an utterance section 41 corresponding to the sound source 1 and an utterance section 42 corresponding to the sound source 2 are detected as the utterance sections, respectively, as shown in FIG. 4A. In this example, however, there is a concern that since the number of sound sources is changed like 0→1→2→1→0, this change may have an influence on the section detection.

In the null beam forming pattern, the "valley" corresponding to the sound source direction shows a tendency to become shallower with an increase in the number of sound sources. That is, the larger the number of "valleys" is, the shallower each "valley" is. For this reason, for example, when the threshold value 38 described with reference to FIG. 3 is adjusted in a section in which only one sound source generates voice, the detection may be unstable in a section in which the plurality of sound sources generates voice.

That is, in the section (the section corresponding to the utterance section 42 shown in FIG. 4A), such as utterance sections 43 and 44 shown in FIG. 4B, in which two utterances are overwritten, an intermittent section may be detected in some cases. Only any section corresponding to the utterance section 42 is not sometimes detected or only one sound source is sometimes detected depending on the setting of the threshold value.

On the other hand, when a large threshold value is set, there is a lesser possibility that the section is fragmented into pieces when the plurality of sound sources generates voices (utterance sections 45 and 46 shown in FIG. 4C). On the contrary, there is a higher possibility of detecting the local minimums, such as the local minimums 34 to 37 shown in FIG. 3, which do not correspond in the sound source direction in the null beam forming pattern as the direction points. As a consequence, there is a higher possibility of detecting "false utterance sections", such as utterance sections 47 shown in FIG. 4C, which do not correspond to the utterance.

In the method of executing the direction estimation based on the null beam in the sound source direction, it has to be determined how deep the depth of the local minimum in order to consider the local minimum as the "null beam corresponding to the sound source direction" in the pattern of the relationship between the direction and the gain. When the determination is executed with the threshold value, there is trade-off. As a consequence, even when the section detection is executed based on the direction estimation, it is difficult to prevent both the detection failure (non-detection or section fragmentation) and the erroneous detection.

SUMMARY

It is desirable to provide a sound signal processing apparatus, a sound signal processing method, and a program capable of preventing detection failure (non-detection or section fragmentation) or erroneous detection and realizing high-accurate speech section detection in a configuration in which speech section detection is executed based on sound source direction estimation.

According to an embodiment of the present technique, there is provided a sound signal processing apparatus including: a direction estimation unit detecting one or more direction points indicating a sound source direction of a sound signal for each of blocks divided in a predetermined time unit; and a direction tracking unit connecting the direction points to each other between the plurality of blocks and detecting a section in which a sound is active. The direction estimation unit includes a spatial filter generation unit generating a null beam forming filter, which is a spatial filter with low sensitivity (gain) for the sound source direction, and a directivity beam forming filter, which is a spatial filter with high sensitivity (gain) for the sound source direction, a null beam forming pattern generation unit generating a null beam forming pattern which indicates correspondence relationship data between a direction and a gain and corresponds to the null beam forming filter, a directivity beam forming pattern generation unit generating a directivity beam forming pattern which indicates correspondence relationship data between the direction and the gain and corresponds to the directivity beam forming filter, and a direction point detection unit detecting direction points which indicate a sound direction and contain both a local minimum in the null beam forming pattern and a local maximum in the directivity beam forming pattern.

In the sound signal processing apparatus according to the embodiment of the present technique, the spatial filter generation unit may calculate eigenvalues and eigenvectors through an eigenvalue decomposition process on a covariance matrix calculated for each block from an observation signal of the time-frequency domain generated from the sound signal and may generate the directivity beam forming filter using the eigenvector corresponding to the calculated maximum eigenvalue.

In the sound signal processing apparatus according to the embodiment of the present technique, the spatial filter generation unit may calculate eigenvalues and eigenvectors through an eigenvalue decomposition process on a covariance matrix calculated for each block from an observation signal of the time-frequency domain generated from the sound signal and may generate the directivity beam forming filter by weighted summing or a weighted averaging over all the eigenvectors with using an eigenvalue as a weight.

In the sound signal processing apparatus according to the embodiment of the present technique, the spatial filter generation unit may calculate eigenvalues and eigenvectors through an eigenvalue decomposition process on a covariance matrix calculated for each block from an observation signal of the time-frequency domain generated from the sound signal, may calculate a transformed matrix $V'(\omega)$ through a calculation process using a matrix $V(\omega)$ formed by the eigenvectors and a diagonal matrix $D(\omega)$ formed by the eigenvalues, and may generate the null beam forming filter using any one of rows of the calculated transformed matrix $V'(\omega)$.

In the sound signal processing apparatus according to the embodiment of the present technique, the direction point detection unit may determine whether the minimum of the null beam forming pattern is selected as the direction point by applying a dynamic threshold value calculated based on a minimum value of the null beam forming pattern in a vicinity block group of the block to be subjected to a new direction point detection process.

In the sound signal processing apparatus according to the embodiment of the present technique, the direction point detection unit may distinguish between a strong direction point, which satisfies the condition that the value of the local minimum in the null beam forming pattern is less than the value of the local maximum in the corresponding directivity beam forming pattern, and a weak direction point, which does not satisfy the condition, may select a weak direction point as the direction point indicating the sound source direction if the weak direction point is present inside the section being generated, and may ignore a weak direction point which is outside the section being generated.

In the sound signal processing apparatus according to the embodiment of the present technique, the direction point detection unit may distinguish between a strong direction point, which satisfies the condition that the value of the local minimum in the null beam forming pattern is less than the value of the local maximum in the corresponding directivity beam forming pattern, and a weak direction point, which does not satisfy the condition, may select both the strong direction point and the weak direction point as the direction points indicating the sound source direction in a process of extending and defining the section being generated, and may select only the strong direction point as the direction point indicating the sound source direction in the beginning of a new section to be generated.

According to another embodiment of the present technique, there is provided a sound signal processing method which is executed by a sound signal processing apparatus. The sound signal processing method including: detecting one or more direction points indicating a sound source direction of a sound signal for each of blocks divided in a predetermined time unit by a direction estimation unit; and connecting the direction points to each other between the plurality of blocks and detecting a section in which a sound is active, by a direction tracking unit. The detection of the direction point includes generating a null beam forming filter, which is a spatial filter with low sensitivity for the sound source direction, and a directivity beam forming filter, which is a spatial filter with high sensitivity for the sound source direction, generating a null beam forming pattern which indicates correspondence relationship data between a direction and a gain and corresponds to the null beam forming filter, generating a directivity beam forming pattern which indicates correspondence relationship data between the direction and the gain and corresponds to the directivity beam forming filter, and detecting direction points which indicate a sound direction and contain both a local minimum in the null beam forming pattern and a local maximum in the directivity beam forming pattern.

According to still another embodiment of the present technique, there is provided a program causing a sound signal processing apparatus to execute sound signal processing. The program causes a direction estimation unit to execute detecting one or more direction points indicating a sound source direction of a sound signal for each of blocks divided in a predetermined time unit; and causes a direction tracking unit to execute connecting the direction points to each other between the plurality of blocks and detecting a section in which a sound is active. The detecting of the direction point includes generating a null beam forming filter, which is a spatial filter with low sensitivity for the sound source direction, and a directivity beam forming filter, which is a spatial filter with high sensitivity for the sound source direction, generating a null beam forming pattern which indicates correspondence relationship data between a direction and a gain and corresponds to the null beam forming filter, generating a directivity beam forming pattern which indicates correspondence relationship data between the direction and the gain and corresponds to the directivity beam forming filter, and detecting direction points which indicate a sound direction and contain both a local minimum in the null beam forming pattern and a local maximum in the directivity beam forming pattern.

The program according to the embodiment of the present technique is a program which can be provided by a storage medium or a communication medium supplied in a computer-readable format to, for example, an image processing apparatus or a computer system capable of executing various program codes. By providing the program in the computer-readable format, a process is realized on an information processing apparatus or a computer system in accordance with the program.

The other objectives, features, advantages of the embodiments of the present technique are apparent from embodiments described later and the detailed description based on the accompanying drawings. A system in the specification has a logical collective configuration of a plurality of apparatuses and is not limited to a configuration the apparatuses with each configuration are provided within the same casing.

In the configurations according to the embodiments of the present technique, the apparatus and the method realizing the process of detecting the utterance section from the sound signal with high accuracy is embodied. Specifically, the apparatus includes a direction estimation unit detecting one or more direction points indicating a sound source direction of a sound signal for each of blocks divided in a predetermined time unit; and a direction tracking unit connecting the direction points to each other between the plurality of blocks and detecting a section in which a sound is active. The direction estimation unit generates a null beam forming pattern which indicates correspondence relationship data between the direction and the gain and corresponds to a null beam forming filter, which is a spatial filter with low sensitivity for the sound source direction, and a directivity beam forming pattern which indicates correspondence relationship data between the direction and the gain and corresponds to a spatial filter with high sensitivity for the sound source direction. The direction estimation unit detects a direction, in which a minimum of the null beam forming pattern and a maximum of the directivity beam forming pattern are combined, as a direction point indicating the sound source direction. The speech section is detected with more accuracy through this process.

BRIEF DESCRIPTION OF THE DRAWINGS

FIGS. 20A and 20B are diagrams for explaining the reason for performing multi-adoption checking;

FIG. 21 is a flowchart illustrating the details of a "section output and rejection" process of step S407 of the flowchart shown in FIG. 19;

DETAILED DESCRIPTION OF EMBODIMENTS

Figure 1A:
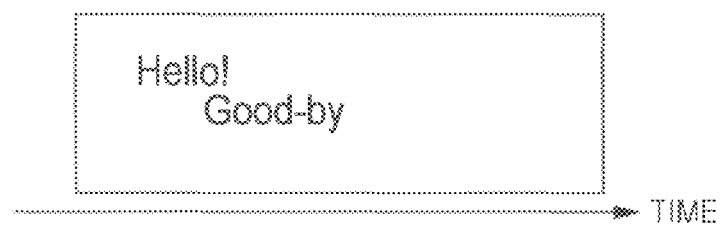
FIGS. 1A to 1D are diagrams illustrating the overview of a method of detecting a speech section using sound source estimation.
Figure 1B:
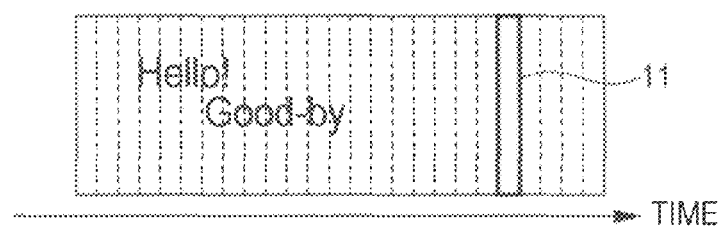

Hereinafter, a sound signal processing apparatus, a sound signal processing method, and a program will be described in detail with reference to the drawings.

The description thereof will be made as follows.

1. Overview of Sound Signal Processing in the Disclosure
2. Details of Sound Signal Processing in the Disclosure
2-1. Combined Configuration of Null Beam Forming Pattern and Directivity Beam Forming Pattern
2-2. Change in Direction Point Detection Condition Depending on Section State
2-3. New Null Beam Forming Filter and Directivity Beam Forming Filter
3. Configuration and Processing of Sound Signal Processing Apparatus
4. Processing Sequence Executed By Sound Signal Processing Apparatus
5. Other Embodiments (Modified Examples)
6. Summary of Advantages In the specification, $A\_b$ means that the suffix b of A is a subscript and $A\textasciicircum b$ means that the suffix b of A is a superscript.

1. Overview of Sound Signal Processing in the Disclosure

A sound signal processing described below executes speech section detection based on sound source direction estimation and realizes the speech section detection with high accuracy while preventing detection failure (non-detection or section fragmentation) or erroneous detection.

In the above-described techniques according to the related art, only a null beam forming pattern is used when a sound source direction is calculated. Therefore, detection failure such as non-detection of actual utterance or failure caused since one speech section is detected such that the speech section is fragmented into a plurality of pieces or erroneous detection may occur.

According to a configuration described below, the detection failure (non-detection or section fragmentation) or the erroneous detection of the speech section is prevented by a process of using another information as well as the null beam forming pattern. Further, the accuracy of the section detection is improved by reflecting section information obtained through tracking on detection of direction points.

Sound signal processing described below has the following features (first to third features).

First Feature: Combination of Null Beam Forming Pattern and Directivity Beam Forming Pattern A spatial filter having directivity toward a sound source direction is generated as well as a spatial filter having a null beam toward the sound source direction and a pattern for a direction and a gain are calculated for each filter. The pattern for the spatial filter having a null beam toward the sound source direction is referred to a "null beam forming pattern" and the pattern for the spatial filters having directivity toward the sound source direction is referred to as a "directivity beam forming pattern."

The direction point is detected using both the patterns.

Second Feature: Change in Direction Point Detection Condition Depending on Section State The condition for the direction point detection is changed by determining the start of a section and determining the end of a section.

Hereinafter, a spatial filter having directivity toward the sound source direction is referred to as a "directivity beam forming filter." Further, a pattern for the direction and the gain obtained with the "directivity beam forming filter" is referred to as a "directivity beam forming pattern."

That is, the configuration described below has one feature of using not only the "null beam forming filter" with low directivity toward the sound source direction and the "null beam forming pattern" which is a pattern for the direction and the gain obtained with the "null beam forming filter" but also the "directivity beam forming filter" and the "directivity beam forming pattern" having the reverse features to the null beam forming filter and the null beam forming pattern.

Further, the following is devised even for generation of the null beam forming filter and the directivity beam forming filter.

Third Feature: New Null Beam Forming Filter and Directivity Beam Forming Filter

Instead of directly using an eigenvector calculated from a covariance matrix of an observation signal, a vector processed in a way described below is used in the null beam forming filter and the directivity beam forming filter.

2. Details of Sound Signal Processing in the Disclosure

Hereinafter, the sound signal processing in the disclosure will be described in detail in the above-described feature order.

2-1. Combined Configuration of Null Beam Forming Pattern and Directivity Beam Forming Pattern First, the combined configuration of the null beam forming pattern and the directivity beam forming pattern will be described.

Figure 5:
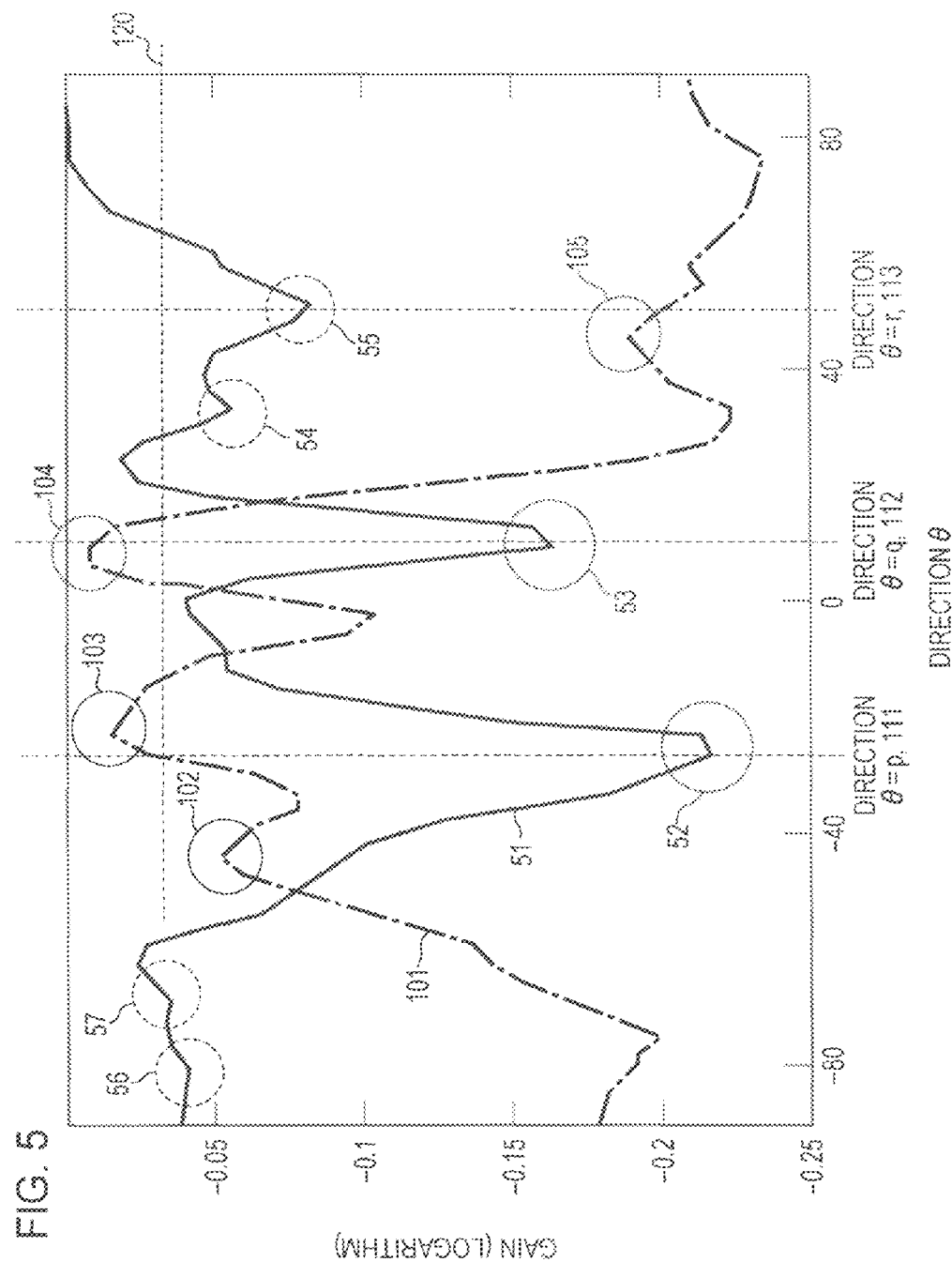
FIG. 5 is a diagram illustrating a null beam forming pattern and a directivity beam forming pattern repeatedly plotted in a given block.

FIG. 5 is a diagram illustrating the null beam forming pattern and the directivity beam forming pattern repeatedly plotted in a given block. A method of generating each pattern will be described later.

The block refers to the same block as the block 11 described above with reference to FIGS. 1A to 1D. The length of the block is sufficiently shorter than the length of a normal utterance. For example, the length of the block is set to 1/10 seconds or 1/8 seconds.

FIG. 5 shows the following two patterns in a given block.

(a) One pattern is a directivity beam forming pattern 101 which is a pattern for the direction and the gain obtained by the "directivity beam forming filter" which is a spatial filter with high sensitivity toward the sound source direction.

(b) The other pattern is a null beam forming pattern 51 which is a pattern for the direction and the gain obtained by the "null beam forming filter" which is a spatial filter with low sensitivity toward the sound source direction, that is, a spatial filter in which a null beam is set in the sound source direction.

The relationship between the directions (horizontal axis) and the gains (vertical axis) of the two patterns are plotted. The vertical axis is expressed by logarithm.

Figure 3:
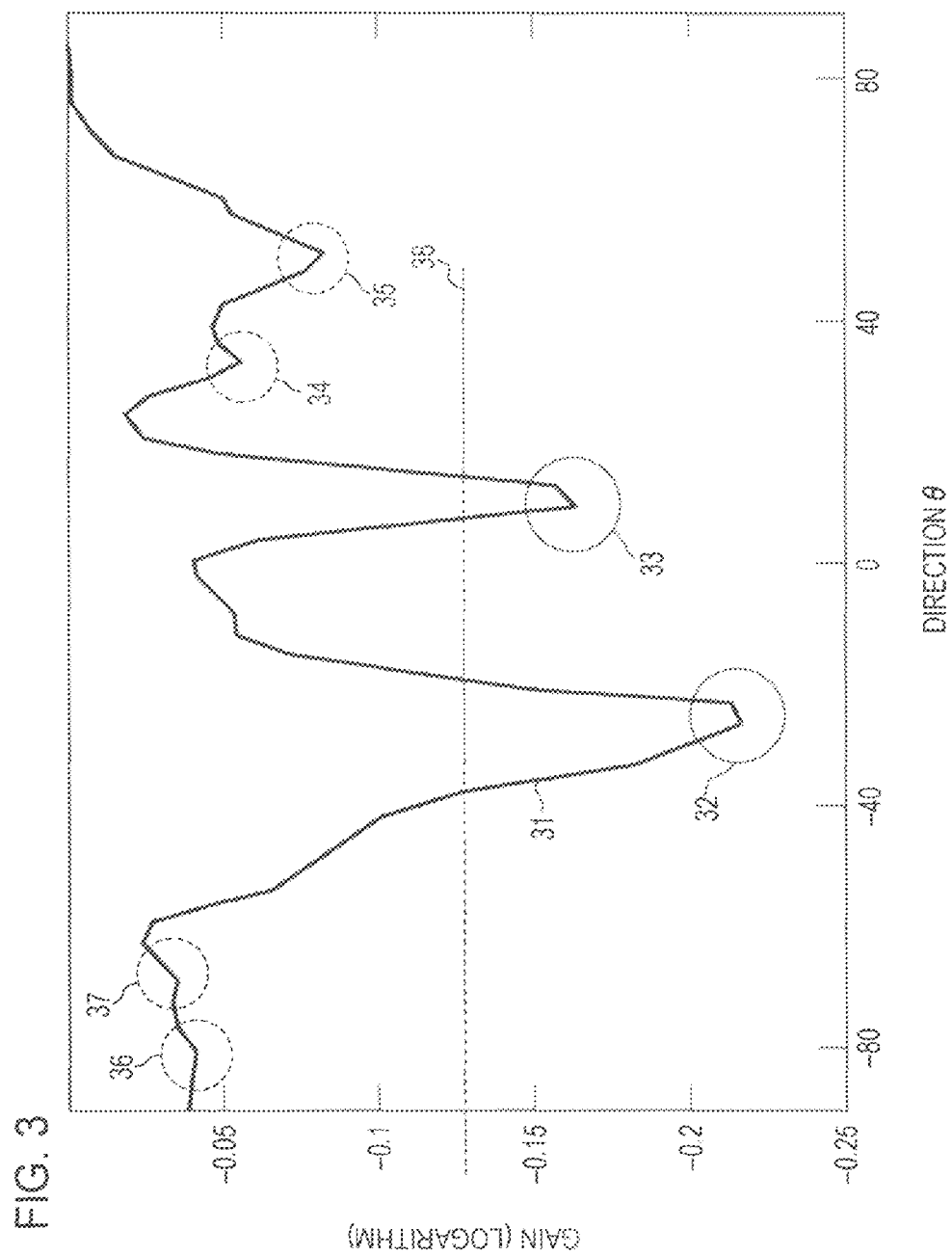
FIG. 3 is a diagram illustrating a directivity characteristic of the spatial filter in which a null beam is directed in a sound source direction, that is, a plotted relationship between a direction (horizontal axis) and a gain (vertical axis)

The null beam forming pattern 51 is the same null beam forming pattern as the null beam forming pattern 31 described above with reference to FIG. 3 and has a feature in which sensitivity is low in the sound source direction. Local minimums 52 to 57 shown in FIG. 5 correspond to the local minimums 32 to 37 shown in FIG. 3, respectively. The directions set in these local minimums 52 to 57 can be estimated to be a sound source direction.

On the other hand, the directivity beam forming pattern 101 is a directivity beam forming pattern in the same block. The directivity beam forming pattern 101 has directivity (the local maximum of a gain) in the sound source direction within a block. However, there is the local maximum which does not correspond in the sound source direction. The directivity beam forming pattern 101 shown in the drawing has four local maximums 102 to 105. The directions set in these local maximums 102 to 105 can be estimated to be the sound source direction.

The sound source direction can be detected with high accuracy by searching for a direction in which the null beam forming pattern 51 has the local minimum and the directivity beam forming pattern 101 has the local maximum.

For example, in the example shown in FIG. 5, there are six local minimums, that is, the local minimums 52 to 57 in the null beam forming pattern 51. The local minimums clearly present in the local maximums of the directivity beam forming pattern 101 near the same directions (θ) as that of the local minimums 52 to 57 are the two local minimums 52 and 53.

That is, as understood in FIG. 5, the local maximum 103 of the directivity beam forming pattern 101 is present in nearly the same direction (direction: θ=p, 111) as that of the local minimum 52 of the null beam forming pattern 51.

Further, the local maximum 104 of the directivity beam forming pattern 101 is present in nearly the same direction (direction: θ=q, 112) as that of the local minimum 53 of the null beam forming pattern 51.

Furthermore, the local maximum 105 of the directivity beam forming pattern 101 is present in nearly the same direction (direction: θ=r, 113) as that of the local minimum 55 of the null beam forming pattern 51. However, it can be determined that this direction is not the genuine sound source direction. A direction rejection process will be described below in the article of "2.2 Change in Direction Point Detection Condition Depending on Section State."

In order to extract a direction point corresponding to a genuine sound source as accurately as possible, a determination process is executed under the following conditions (first to fifth conditions).

That is, the sound signal processing apparatus determines whether each direction satisfies all of the first condition to the fifth condition described below. When the sound signal processing apparatus determines whether each direction satisfies all of the first condition to the fifth condition, the sound signal processing apparatus executes a process of considering each direction as a first direction point, that is, a direction point indicating the sound source direction.

(First Condition) Each direction is a direction corresponding to the local minimum of the null beam forming pattern.

(Second Condition) Each direction is included in a range of a first rank to an (n−1)-th rank in the order of the smaller minimum value (number of microphones=n).

(Third Condition) The value of the local minimum is smaller than a predefined threshold value.

(Fourth Condition) The local maximum of the directivity beam forming pattern is present near the direction corresponding to the local minimum.

(Fifth Condition) A determination condition based on a threshold value dynamically calculated from the minimum value of the null beam forming pattern in an immediately adjacent block group is satisfied (determination condition in accordance with a dynamic threshold value).

Hereinafter, the first to fifth conditions described above will be described.

(First Condition) Each direction is a direction corresponding to the local minimum of the null beam forming pattern.

In the embodiment of the present technique, the minimum of the null beam forming pattern is first searched, as in the method according to the related art.

(Second Condition) Each direction is included in a range of a first rank to an (n−1)-th rank in the order of the smaller minimum value (number of microphones=n).

The first rank to the (n−1)-th rank are formed in the order of the smaller minimum values for the local minimums of the null beam forming pattern detected under the first condition.

For example, the first rank to the third rank are formed in the order of the smaller value (gain value) of the local minimums, since n=4, that is, the null beam forming pattern 51 shown in FIG. 5 is generated from signals recorded with four microphones.

As the result of the local minimum selection process, the selected local minimums are three local minimums 52, 53, and 55.

When the first condition is expressed as an equation, Equation [1.1] below is formed.

$$P_N(\theta_{i-1}) \geq P_N(\theta_i) \leq P_N(\theta_{i+1}) \quad [1.1]$$

$$P_N(\theta_{i-2}) \geq P_N(\theta_{i-1}) \geq P_N(\theta_i) \leq P_N(\theta_{i+1}) \leq P_N(\theta_{i+2}) \quad [1.2]$$

$$P_N(\theta_i) < T_{static} \quad [1.3]$$

$$P_D(\theta_{i'-1}) \leq P_D(\theta_{i'}) \geq P_D(\theta_{i'+1}) \quad [1.4]$$

$$P_D(\theta_{i'-2}) \leq P_D(\theta_{i'-1}) \leq P_D(\theta_{i'}) \geq P_D(\theta_{i'+1}) \geq P_D(\theta_{i'+2}) \quad [1.5]$$

$$P_{min} = \min_{B-B_o \leq b \leq B-1, \theta} P_N^{|b|}(\theta) \quad [1.6]$$

$$T_{dynamic} = \alpha P_{min} \quad [1.7]$$

$$P_N(\theta_i) < T_{dynamic} \quad [1.8]$$

$$P_N(\theta_i) < P_D(\theta_{i'}) \quad [1.9]$$

In Equation [1.1] above, P_N ($\theta_i$) denotes a null beam forming pattern in the currently targeted block.

The angles (directions) of the null beam forming pattern are expressed discretely (for example, a 5° interval from −180° to)+180° and the values of the angles are expressed as $\theta\_1, \theta\_2, \ldots,$ and $\theta\_i$.

Whether to P_N ($\theta\_i$) is the minimum value at an angle $\theta\_i$ can be determined by comparing adjacent angles $\theta\_\{i-1\}$ and $\theta\_\{i+1\}$ to each other and Equation [1.1] is satisfied.

When the interval (step width) of the angles is small, the angles adjacent to the adjacent angles may be considered using Equation [1.2] instead of Equation [1.1] in that there is a lesser possibility that the minute concave and convex are erroneously detected as the null beam.

(Third Condition) The value of the local minimum is smaller than a predefined threshold value.

The local minimums of the null beam forming pattern formed under to the first and second conditions are selected based on the predefined threshold value.

Specifically, the determination is executed by Equation [1.3] above using a predefined fixed threshed value: T_{static}. The method of selecting the local minimums based on the threshold value is the same as the method according to the related art. In the present technique, however, an objective of the threshold value and the method of setting the threshold value are different from those of the method according to the related art.

The threshold value in the method according to the related art is used to narrow down the direction points in the block in which there is a sound source. Therefore, the setting of the threshold value is severe. In this embodiment, however, the threshold values is used to prevent the direction point from being erroneously detected in a quiet environment (environment in which no clear sound source is present). That is, since only one definite extreme value (minimum or maximum) is not present in either the null beam forming pattern or the directivity beam forming pattern under the quiet environment, there is a concern that the direction point may be erroneously detected from the minute concave and convex. However, the erroneous detection can be prevented by the threshold value. Since this threshold value may be set once to the extent that the direction point is not detected under the quiet environment, this threshold value can easily be set in comparison to the threshold value according to the related art.

An example of the threshold value is a threshold value 120 shown in FIG. 5.

(Fourth Condition) The local maximum of the directivity beam forming pattern is present near the direction corresponding to the local minimum.

Next, the fourth condition will be described. It is determined whether there is the local maximum of the directivity beam forming pattern near each of the local minimums selected under the first to third conditions. Since the positions of the local maximum and local minimum are not necessarily identical to each other and may be deviated from each other in some case, this determination is executed in consideration of the margin of the deviation.

Specifically, on the assumption that the position of the local minimum is $\theta\_i$ and the margin is $\beta$, it is determined whether there is $\theta\_\{i'\}$ in the following equation satisfying Equation [1.4] above:

$$\theta - \beta \leq \theta\_\{i'\} \leq \theta + \beta.$$

In this equation, P_D ($\theta\_i$) represents the directivity beam forming pattern of the same block.

As in Equation [1.1] above, Equation [1.5] may be used instead of Equation [1.4].

In the example of FIG. 5, the local maximums are present in the directivity beam forming pattern 101 in all the directions corresponding to the local minimums 52, 53, and 55 of the null beam forming pattern 51, that is, a direction: θ=p, 111, a direction: θ=q, 112, and a direction: θ=r, 113.

That is, the local maximum 103 of the directivity beam forming pattern 101 corresponds to the local minimum 52 of the null beam forming pattern 51, the local maximum 104 of the directivity beam forming pattern 101 corresponds to the local minimum 53 of the null beam forming pattern 51, and the local maximum 105 of the directivity beam forming pattern 101 corresponds to the local minimum 55 of the null beam forming pattern 51.

The local minimums 52, 53, and 55 of the null beam forming pattern 51 having the correspondence relationship are candidates of the genuine sound source directions.

(Fifth Condition) A determination condition based on a threshold value dynamically calculated from the minimum value of the null beam forming pattern in an immediately adjacent block group is satisfied (determination condition in accordance with a dynamic threshold value).

The fifth condition is used in order to further narrow down the direction points.

The fifth condition is a condition for preventing the direction point from being erroneously detected under, for example, a noise environment. The method of detecting the speech section based on the direction estimation is effective to some extent for a sound source close to the microphone even in the noise environment (environment in which a plurality of sound sources is present in the rear). However, since the sound source in the rear is detected as the direction point under only the first to fourth conditions, the threshold value is dynamically changed in order to prevent the sound source from being detected as the direction point. The mechanism will be described with reference to FIG. 6.

Figure 1C:
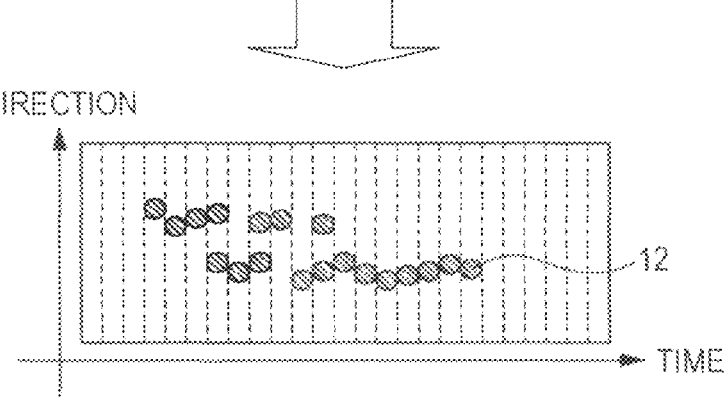
Figure 6:
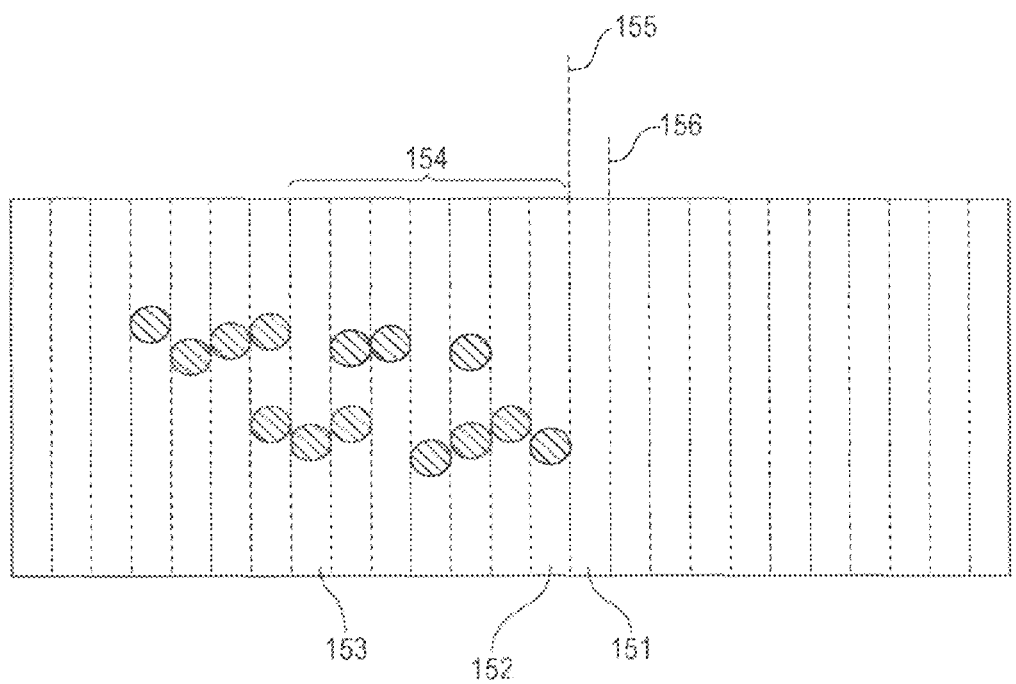
FIG. 6 is a diagram illustrating sound detection directions plotted in as the direction points in a block unit divided in a predefined time interval when the horizontal axis represents a time and the vertical axis represents a direction.

FIG. 6 corresponds to FIG. 1C described with reference to FIGS. 1A to 1D. The horizontal axis represents a time and the vertical axis represents a direction. A sound detection directions are plotted as the direction points in a block unit divided in a predefined time interval.

FIG. 6 shows a state where the direction points are calculated up to the middle block.

That is, analysis (detection of the direction points) is completed up to a block B2, 152 and the analysis is in progress in an adjacent block B, 151. Here, the threshold value is calculated using information regarding the immediately adjacent block group 154. Specifically, the threshold value is calculated by Equation [1.6] and Equation [1.7] on the assumption that P_N^[b] (θ) is a null beam forming pattern of a b-th block, B is the number of the block B3, 151 which is currently analyzed, and B0 is the number of blocks of an immediately adjacent block group 154.

Equation [1.6] indicates the minimum value when an angle θ is changed within an arbitrary range (for example, from −π to +π) while changing b from B−B0 (=block B1) to B−1 (=block B2). The value calculated in this way is assumed to be P_{min} and a dynamic threshold value obtained by multiplying this value by a constant coefficient α is assumed to be T_{dynamic} (Equation [1.7]).

The coefficient α is a value such as 0.1 or 0.2 in the range of 0 and 1. The determination is executed by Equation [1.8].

The minimum value of the null beam forming pattern is normally is a negative value so that the maximum value is adjusted to be 0 (which will be described later). Multiplication of the minimum value by the coefficient α means that the threshold value is set between the maximum value and the minimum value. A shallow concave in the null beam forming pattern is prevented from being erroneously detected as the direction point, since the threshold value is set to be smaller than the fixed threshold value: T_{static} under the above-described third condition in the noise environment by using the dynamic threshold value: T_{dynamic}.

However, in the quiet environment, the threshold value may be set to be larger than the fixed threshold value: T_{static} under the third condition by using the dynamic threshold value: T_{dynamic}, thereby causing a side effect of increasing the erroneous detection. Therefore, the third condition (Equation [1.3]) continues to be used. In this way, since the smaller value between the threshold value: T_{dynamic} and the fixed threshold value: T_{static} serves as the genuine threshold value, the erroneous detection can be prevented in either the noise environment or the quiet environment.

Thus, when the direction point detection process is executed, it is executed whether the local minimum of the null beam forming pattern is determined as the direction point by applying the dynamic threshold value calculated based on the minimums of the null beam forming pattern in the block group near the block to be subjected to the new direction point detection process.

Hereinafter, a method of generating the null beam forming pattern and the directivity beam forming pattern will be described.

The method of generating the null beam forming pattern is nearly the same as the MUSIC method according to the related art. The method of generating the null beam forming pattern is executed by examining the directivity characteristic even in correspondence to the minimum eigenvalue in an eigenvector corresponding to a covariance matrix of the observation signal. On the other hand, the method of generating the directivity beam forming pattern is executed by examining the directivity characteristic even in correspondence to the maximum eigenvalue in the eigenvector.

The process will be described with reference to Equation [2.1] to [2.8] shown below.

$$X(\omega, t) = \begin{bmatrix} X_1(\omega, t) \\ \vdots \\ X_n(\omega, t) \end{bmatrix} \quad [2.1]$$

$$R(\omega) = \langle X(\omega, \tau) X(\omega, \tau)^H \rangle_{t-L' < \tau \le t} \quad [2.2]$$

$$R(\omega) = V(\omega) D(\omega) V(\omega)^H \quad [2.3]$$

$$V(\omega) = [V_1(\omega) \ \ldots \ V_n(\omega)] \quad [2.4]$$

$$D(\omega) = \begin{bmatrix} d_1(\omega) & & 0 \\ & \ddots & \\ 0 & & d_n(\omega) \end{bmatrix} \quad [2.5]$$

$$d_1(\omega) \ge d_2(\omega) \ge \ldots \ge d_n(\omega) \quad [2.6]$$

$$V_k(\omega)^H V_i(\omega) = \begin{cases} 1 & (k = i) \\ 0 & \text{otherwise} \end{cases} \quad [2.7]$$

$$V(\omega)^H V(\omega) = I \quad [2.8]$$

It is assumed that Xk (ω, t) is the result obtained through application of the short-time Fourier transform (STFT) on the signal observed by a k-th microphone among n microphones and X (ω, t) is a vector formed by X1 (ω, t) to Xn (ω, t) (Equation [2.1]).

In this equation, ω denotes a frequency bin number (ω=1, 2, . . . , and M) and t is a frame number.

Next, a covariance matrix R(ω) of the vector X (ω, t) is calculated for each frequency bin ω from the plurality of frames (Equation [2.2]).

In Equation [2.2], <>_{t−L'<τ≤t} denotes a mean of an equation of a parenthesis between the frames satisfying "t−L'<τ≤t". Further, t denotes a frame number (for example, the frame number of a termination 156 of the block B151 shown in FIG. 6) of the termination of a block, L' is the length (the number of frames) of the block, and t−L'+1 denotes the frame number (for example, the frame number of a beginning 155 of the block B151 shown in FIG. 6) of the beginning of the block.

Furthermore, R(ω) denotes a covariance matrix calculated by Equation [2.2] above.

Next, the covariation matrix R(ω) is subjected to eigenvalue decomposition (Equation [2.3]).

In Equation [2.3], D(ω) denotes a diagonal matrix (Equation [2.5]) with eigenvalues and V(ω) denotes a matrix formed by the eigenvectors V_1(ω) to V_n(ω).

The superscript H denotes the Hermite transpose (transpose after elements are transformed to complex conjugate numbers).

Since the covariance matrix R(ω) satisfies R(ω) ^H=R(ω), all of the eigenvalues d_1(ω) to d_n(ω) are real numbers and are arranged in the order of a larger number (Equation [2.6]).

It is assumed that the size of the eigenvectors V_1(ω) to V_n(ω) is 1 and are orthogonal to each other. That is, the eigenvectors V_1(ω) to V_n(ω) satisfy Equation [2.7] and Equation [2.8].

On the assumption that N is the number of sound sources generating voice in the block used in the calculation of the covariance matrix, the eigenvalues and the eigenvectors are divided into two groups, that is, the first half d_1(ω) to d_N (ω) and V_1(ω) to V_N(ω) and the second half d_{N+1}(ω) to d_n(ω) and V_{N+1}(ω) to V_n(ω), which are different from each other in property.

The first half eigenvalues d_1(ω) to d_N(ω) have a value larger than that of the second half d_{N+1}(ω) to d_n(ω) (hereinafter, referred to as a "large eigenvalue"). Further, when the eigenvectors V_1(ω) to V_n(ω) are analyzed as the spatial filter corresponding to the large eigenvalues, the eigenvectors V_1(ω) to V_n(ω) have the directivity characteristic in which directivity is formed in the sound source in the block (which will be described below in detail).

On the other hand, the second half eigenvalues d_{N+1}(ω) to d_n(ω) have a value close to 0 (hereinafter, referred to as a small eigenvalue). Further, when the eigenvectors V_{N+1}(ω) to V_n(ω) corresponding to the small eigenvalue are analyzed as the spatial filter, the eigenvectors V_{N+1}(ω) to V_n(ω) has the directivity characteristic in which the null beam is formed in all of the sound sources in the block.

In effect, when the covariance matrix and the eigenvectors are calculated from the voice recorded in the environment of FIG. 2 and the directivity characteristic is obtained for each eigenvector by a method described below, a plot shown in FIG. 7 can be obtained.

Figure 7:
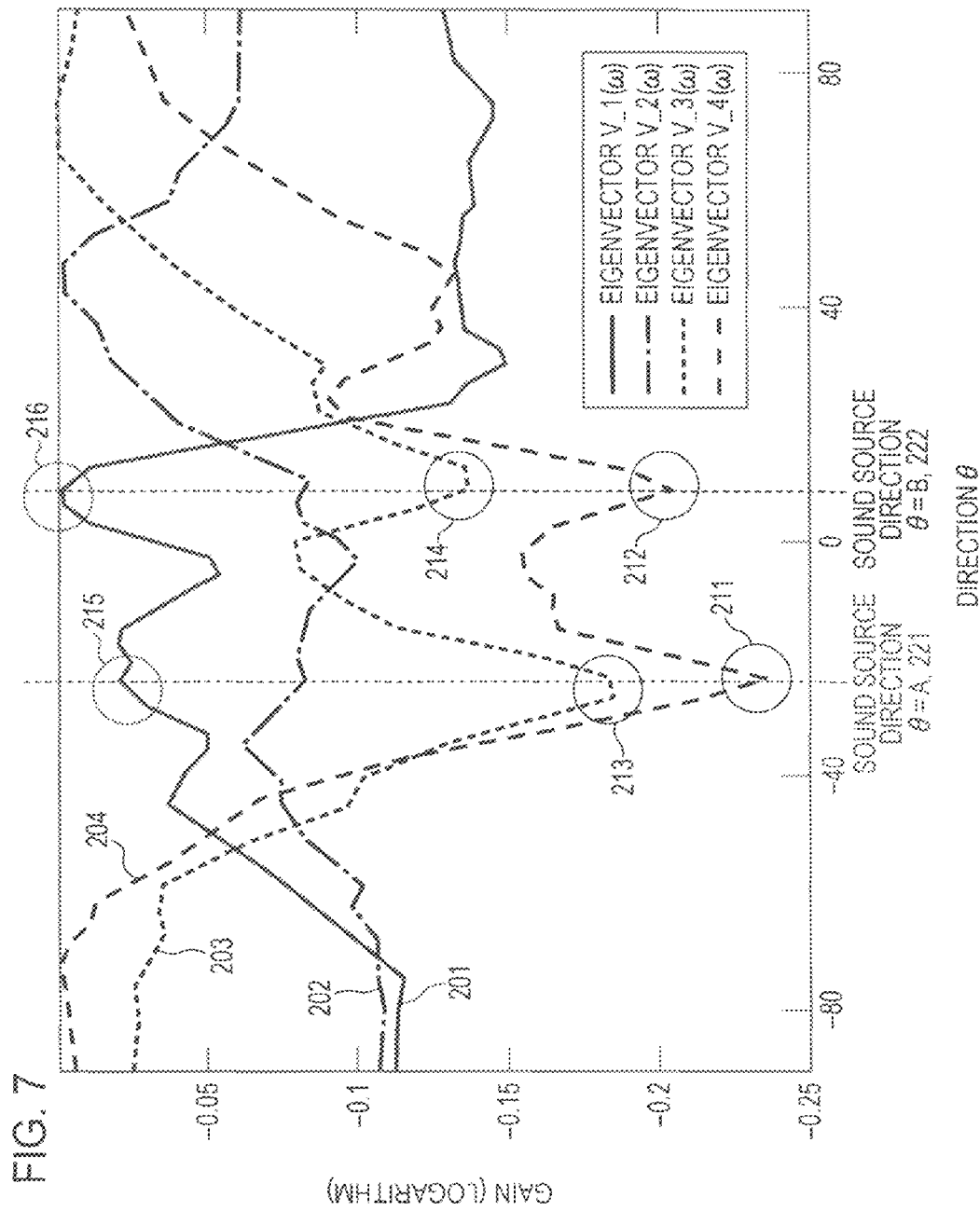
FIG. 7 is a diagram illustrating patterns obtained by calculating a covariance matrix and an eigenvector from voice recorded in the environment of FIG. 2 and obtaining directivity characteristics for respective eigenvectors.

In FIG. 7, directivity characteristic patterns 201 to 204 are directivity characteristic patterns corresponding to the eigenvectors V_1(ω) to V_4(ω), respectively.

Since the number of sound sources is two in this environment, the eigenvector is divided into two pairs, that is, a pair of V_1(ω) and V_2(ω) and a pair of V_3(ω) and V_4(ω).

Since local minimums 211 to 214 are present in the direction in the directivity characteristic patterns 203 and 204 corresponding to the latter (the pair of eigenvectors V_3 (ω) and V_4(ω)), it can be understood that the null beams are formed in two sound source directions: θ=A, 221 and θ=B, 222.

On the other hand, in the directivity characteristic pattern 201 corresponding to the eigenvector V_1(ω) between the directivity characteristic patterns 201 and 202 corresponding to the former (the pair of eigenvectors V_1(ω) and V_2(ω)), it can be understood that the directivity is formed in the two sound source directions: θ=A, 221 and θ=B, 222 based on the maximum values 215 and 216.

Accordingly, in the embodiment of the present technique, the eigenvector V_n(ω) corresponding to the minimum eigenvalue is used as the null beam forming filter (the spatial filter in which the null beam is formed in the sound source direction) (which is the same as that of the method according to the related art). On the other hand, the eigenvector V_1(ω) corresponding to the maximum eigenvalue is used as the directivity beam forming filter (the spatial filter in which the directivity is formed in the sound source direction).

Next, a method of examining the directivity characteristic of each spatial filter will be described. In order to obtain the directivity characteristic, it is necessary to virtually generate signals arriving from various directions. An important factor is a phase difference between the microphones and the phase difference is referred to as a steering vector. A method of generating the steering vector will be described with reference to FIG. 8 and Equation [3.1] to Equation [3.9] below.

$$q(\theta) = \begin{bmatrix} \cos\theta \\ \sin\theta \\ 0 \end{bmatrix} \quad [3.1]$$

$$S_k(\omega, \theta) = \exp\left(j\pi \frac{(\omega-1)F}{(M-1)C} q(\theta)^T (m_k - m)\right) \quad [3.2]$$

$$S(\omega, \theta) = \frac{1}{\sqrt{n}} \begin{bmatrix} S_1(\omega, \theta) \\ \vdots \\ S_n(\omega, \theta) \end{bmatrix} \quad [3.3]$$

$$W_N(\omega) = V_n(\omega)^H \quad [3.4]$$

$$P_N(\omega, \theta) = \log|W_N(\omega)S(\omega, \theta)| \quad [3.5]$$

-continued $$P_N(\theta) = \sum_\omega \{P_N(\omega, \theta) - \max_\theta P_N(\omega, \theta)\} \quad [3.6]$$

$$W_D(\omega) = V_1(\omega)^H \quad [3.7]$$

$$P_D(\omega, \theta) = \log|W_D(\omega)S(\omega, \theta)| \quad [3.8]$$

$$P_D(\theta) = \sum_\omega \{P_D(\omega, \theta) - \max_\theta P_D(\omega, \theta)\} \quad [3.9]$$

Figure 8:
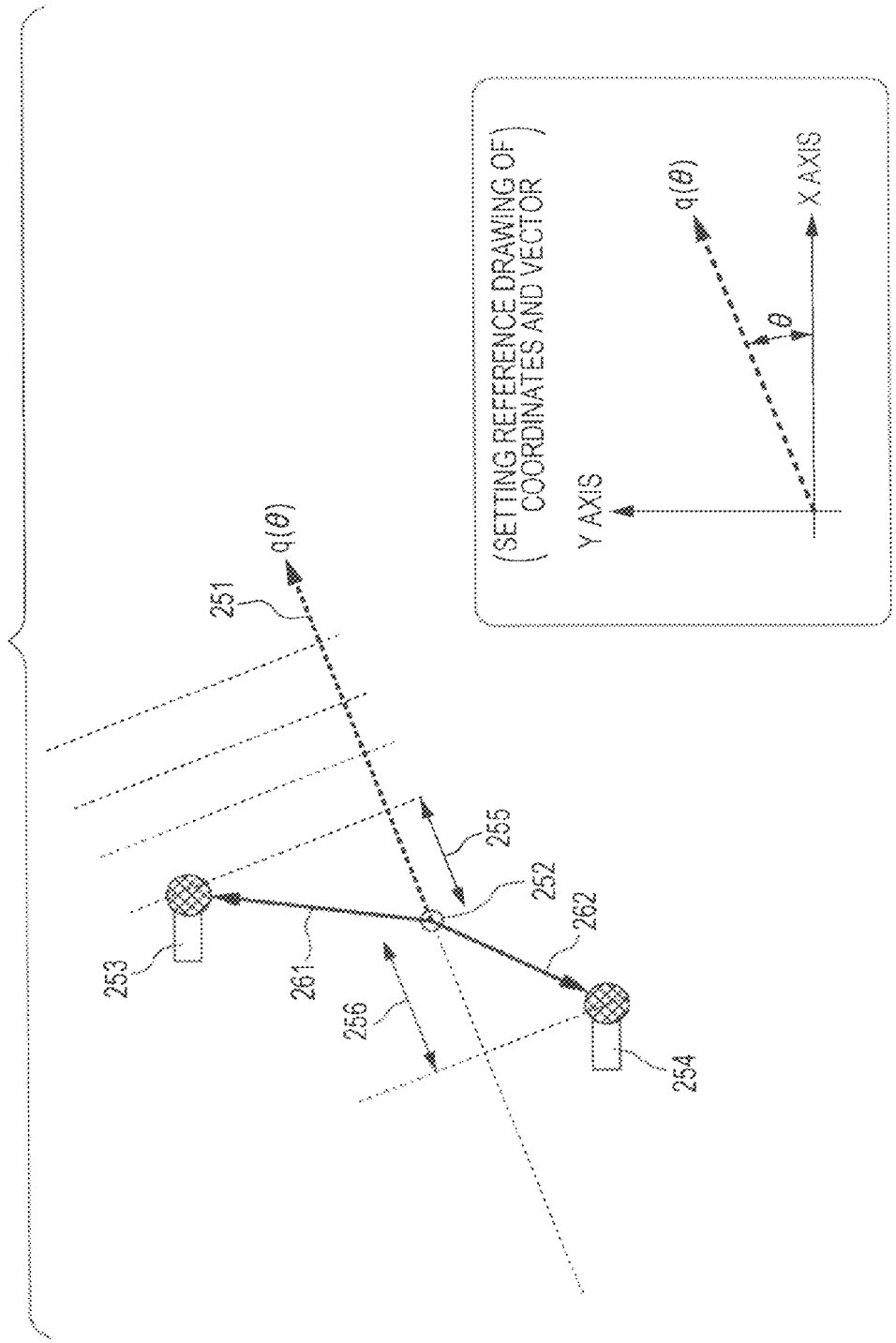
FIG. 8 is a diagram illustrating a method of generating a steering vector.

FIG. 8 shows a microphone k, 253 and a microphone i, 254 as sound signal input units of the sound signal processing apparatus. Further, a reference point 252 for measuring a direction is shown.

The reference point 262 may be any point close to the microphones. The reference point may be set in various methods. For example, the reference point may be set so as to accord with the center between the microphones. Alternatively, the reference point may be set so as to be accord with one of the microphones. It is assumed that m is a positional vector (that is, the coordinates) of the reference point 252.

In order to show a sound arrival direction, a vector is set so as to have the length of 1 on the assumption that the reference point m, 252 is a starting point, and this vector is q(θ). A directional vector q(θ) 251 is shown in the drawing.

When the position of the sound source are nearly the same as that of the microphone in height, the directional vector q(θ) 251 can be considered as a vector on an X-Y plane (the vertical direction is the Z axis) and the components of the directional vector q(θ) can be expressed by Equation [3.1] above.

The direction θ is an angle formed with the X axis (see FIG. 8 (which is a diagram referred to in setting of the coordinates and the vector)).

The sound arriving in the direction of the directional vector q(θ) 251 first arrives in the microphone k, 253, arrives in the reference point m, 252, and then arrives in the microphone i, 254.

A phase difference S_k (ω, θ) of the microphone k, 253 for the reference point m, 252 can be expressed by Equation [3.2] above.

In this equation, j denotes an imaginary unit, M denotes the number of frequency bins, F denotes a sampling frequency, C denotes the velocity of sound, m_k denotes a positional vector of the microphone k, and the superscript T denotes normal transpose.

That is, on the supposition of a planar wave, the microphone k, 253 is closer to the sound source by a distance 255 shown in FIG. 8 compared to the reference point m, 252, whereas the microphone i, 254 is remoter by a distance 256 shown in FIG. 8 from the sound source.

This distance difference can be expressed as q(θ)^T(m_k−m) and q(θ)^T(m_i−m) using the inner product of the vectors.

When the distance difference is converted into a phase difference, it is possible to obtain a calculation equation of the phase difference: S_k (ω, θ) of the microphone k, 253 for the reference point m, 252 indicated by Equation [3.2] above.

The vector S (ω, θ) formed from the phase difference of each microphone is expressed by Equation [3.3] above and is referred to as a steering vector.

The gain for the sound arriving at the angle θ is |W_N(ω) S(ω, θ)| on the assumption that W_N(ω) is the spatial filter in which the null beam is formed in the sound source direction at a frequency bin ω (W_N(ω) is a row vector).

When a round angle θ (for example, a predetermined step width from $-\pi$ to $+\pi$) is changed, the directivity characteristic can be understood (relationship between the arriving direction and the gain).

In the embodiment of the present technique, the Hermite transpose of the eigenvector $V\_n(\omega)$ corresponding to the minimum eigenvalue is used as the null beam forming filter $W\_N(\omega)$ which is the spatial filter for generating the null beam forming pattern (Equation [3.4]) and the logarithm $P\_N(\omega, \theta)$ of the gain is calculated therefrom (Equation [3.5]).

Further, the null beam forming pattern $P\_N(\theta)$ is generated by summation with all the frequency bins (Equation [3.6]).

Likewise, the Hermite transpose of the eigenvector $V\_1(\omega)$ corresponding to the maximum eigenvalue is used as the spatial filter for generating the directivity beam forming pattern, that is, the directivity beam forming filter $W\_D(\omega)$ (Equation [3.7]) and the logarithm $P\_D(\omega, \theta)$ of the gain is calculated therefrom (Equation [3.8]). Further, the directivity beam forming pattern $P\_D(\theta)$ is generated by summation with all the frequency bins (Equation [3.9]).

The suffix N of the null beam forming filter $W\_N(\omega)$ comes from a null beam and the suffix D of the directivity beam forming filter $W\_D(\omega)$ comes from directivity.

The reason for subtracting max $\theta P\_N(\omega, \theta)$ and max_$\theta$-$P\_D(\omega, \theta)$ in Equation [3.6] representing the null beam forming pattern $P\_N(\theta)$ and Equation [3.9] representing the directivity beam forming pattern $P\_D(\theta)$ is that the maximum value of the directivity characteristic in each frequency bin is fitted to 0. In this way, magnitude comparison can be made between the null beam forming pattern and the directivity beam forming pattern.

2-2. Change in Direction Point Detection Condition Depending on Section State

Next, the change in the direction point detection condition depending on the section state will be described.

In the speed section detection, it is preferable that the error detection (voice is detected although the voice is not uttered) is small. On the other hand, it is not preferable that one utterance is fragmented into plurality of sections.

However, when the detection condition of the direction point is fixed, there is trade-off between the two methods. Accordingly, in order to resolve the trade-off, the detection condition of the direction point is changed depending on the tracking state (whether the direction point is in the utterance section) in the embodiment of the present technique.

Specifically, the following sixth condition is set in addition to the above-described first to fifth conditions. The following sixth condition is considered in the detection of the beginning of the section, whereas the sixth condition is not considered in the detection the middle or the termination of the section.

(Sixth Condition) The value of the local minimum of the null beam forming pattern is smaller than the value of the local maximum of the directivity beam forming pattern corresponding to this local minimum.

Hereinafter, the direction point satisfying all of the first to sixth conditions is referred to as a "strong direction point" and the direction point satisfying the first to fifth conditions but satisfying no sixth condition is referred to as a "weak direction point" (both the strong direction point and the weak direction point are included when the "direction points" are simply used).

For example, in FIG. 5, the direction: θ=p, 111 and the direction: θ=q, 112 are the "strong direction points" since the direction: θ=p, 111 and the direction: θ=p, 112 satisfy the sixth condition. However, the: direction: θ=r, 113 is the "weak direction point" since the direction: θ=r, 113 does not satisfy the sixth condition.

Hereinafter, the reason for using the sixth condition will be described.

There is a high possibility that the "strong direction point" correspond to the genuine sound source direction. On the contrary, there are the following various possibilities for the "weak direction point":

(1) the local minimum of the null beam forming pattern and the local maximum of the directivity beam forming pattern are identical to each other by accident (no sound source);

(2) the block corresponding immediately after voice utterance starts or immediately after voice utterance ends (sound source);

(3) short silent section during utterance;

(4) the null beam becomes relatively shallow by balance with other sound source (sound source);

(5) sound such as the sound of a cooling pan continues to be generated low and steadily (sound source, but the sound of the sound source is desired not to be detected); and (6) small sound is instantly generated (sound source, but the sound of the sound source is desired to be detected).

The reason for causing the "weak direction point" from the cases (2), (3), and (6) is the same and is that the "weak direction point" easily occurs when the section in which the sound source generates sound in one block is shorter than the length of the block.

Whether the "weak direction point" is used as the direction point is determined differently in the cases (1) to (6) described above. The weak direction point is rejected in the cases (1) and (6). However, the direction point is rejected in the case (3) or (4), there is the trade-off in which the "section fragmentation" mentioned in "Problems of Technique according to Related Art" easily occurs.

Accordingly, in the embodiment, the "weak direction point" is differently treated within and out of the section.

This process will be described with reference to FIG. 9.

Figure 1D:
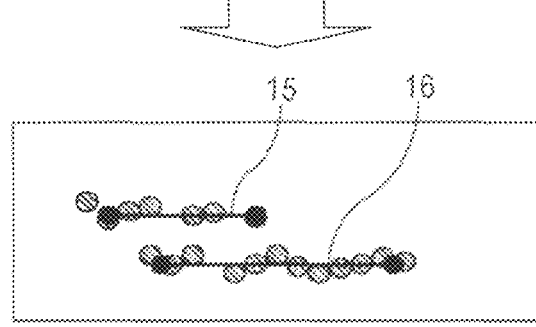
Figure 9:
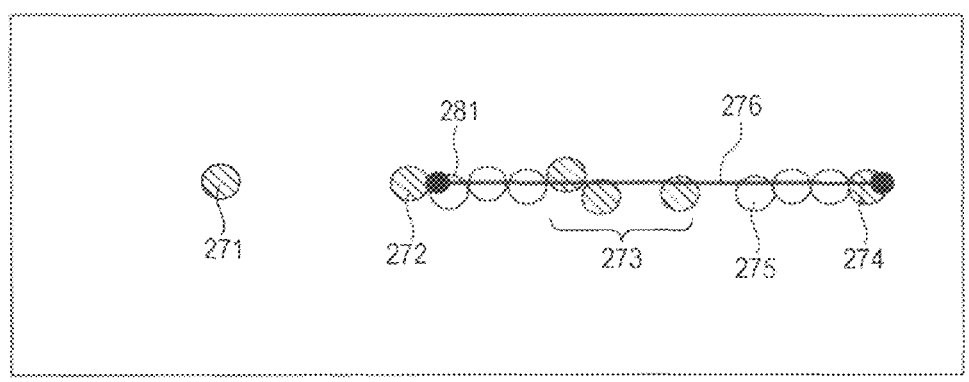
FIG. 9 is a diagram illustrating direction points detected in each block and a section obtained by connecting the direction points to describe a process of differently treating "weak direction points" within and out of the section.

FIG. 9 is similar to FIG. 1D described above. FIG. 9 is a diagram illustrating direction points detected in each block and a section obtained by connecting the direction points. The section of the block is not illustrated.

In FIG. 9, a circle indicates a direction point. A direction point 275 and the like indicated by an entirely colored circle represents the "strong direction point" and direction points 271 to 274 indicated by a diagonal line circle represent the "weak direction points."

A section 276 is a section obtained by connecting the direction points. The "weak direction point" shown solely like the direction point 271 is highly likely to be the weak direction point of the case (1) or (6). The "weak direction points" such as the direction points 273 shown in the midway of the continuous "strong direction points" are highly likely to be the weak direction points of the case (3) or (4).

Accordingly, when the "weak direction point" is present within the section, the "weak direction point" is adopted. On the contrary, when the "weak direction point" is present out of the section, the "weak direction point" is rejected. In FIG. 9, the weak direction points 273 and 274 are adopted as the direction points, whereas the weak direction points 271 and 272 are rejected. When the process of selecting the "weak direction points" in this way is executed, it is possible to prevent the section from being fragmented by the weak direction points 273 shown in the midway of the continuous "strong direction points". Moreover, it is possible to prevent the erroneous detection in which the weak direction point 271 located distant from the "strong direction points" is considered as the direction point.

In the method in which the sixth condition is applied, the weak direction point 272 immediately after start of the utterance is also rejected. A side effect in which the beginning of the utterance section is delayed occurs by the rejection process. However, this side effect can be prevented with ease by providing a margin at the utterance start time. That is, a process of considering that the beginning of an utterance starts in slightly before the detected block may be applied.

2-3. New Null Beam Forming Filter and Directivity Beam Forming Filter

Next, the new null beam forming filter and directivity beam forming filter will be described in detail.

In the article of "2-1. Combined Configuration of Null Beam Forming Pattern and Directivity Beam Forming Pattern", the filters set in the following manner are used as the null beam forming filter and the directivity beam forming filter:

Hermite transpose of the eigenvector $V\_n(\omega)$ corresponding to the minimum eigenvalue as the null beam forming filter $W\_N(\omega)$ (Equation [3.4]); and The Hermite transpose of the eigenvector $V\_1(\omega)$ corresponding to the maximum eigenvalue as the directivity beam forming filter $W\_D(\omega)$ (Equation [3.7]).

The filters $V\_n(\omega)$ and $V\_1(\omega)$ are used, but the usable eigenvectors are n-N eigenvectors and N eigenvectors, respectively (n is the number of microphones and N is the number of sound sources in a block). When the plurality of eigenvectors can be used, the local maximums and the local minimums are more clearly shown in the plot of each directivity characteristic or the minute concaves and convexes disappear, thereby expecting accuracy improvement in the direction point detection.

However, estimating the number of sound sources N accurately before the generation of the directivity characteristic pattern is a difficult task. Accordingly, in the embodiment of the present technique, the following method is devised to reflect the plurality of eigenvectors without estimating the number of sound sources to the spatial filter.

Equation [4.1] below is used as the directivity beam forming filter $W\_D(\omega)$ instead of Equation [3.7].

$$W_D(\omega) = \sum_k d_k(\omega) V_k(\omega)^H \quad [4.1]$$

$$V'(\omega) = V(\omega) D(\omega)^{-1/2} V(\omega)^H \quad [4.2]$$

Equation [4.1] above is a weighted sum obtained by multiplying and adding the Hermite transpose $V\_k(\omega)^H$ by the eigenvalue $d\_k(\omega)$ of respective eigenvectors as a weight. The eigenvector corresponding to a larger eigenvalue is more strongly reflected on the directivity beam forming filter $W\_D(\omega)$.

Since the directivity of the eigenvector corresponding to the larger eigenvalue is formed in the sound source direction, the directivity beam forming filter $W\_D(\omega)$ also becomes the spatial filter of which the directivity is formed in the sound source direction.

When the directivity beam forming filter is generated, the eigenvalue and the eigenvector are calculated through an eigenvalue decomposition process on the covariance matrix calculated for each block from the observation signal of a time-frequency domain generated from the sound signal.

Then, the directivity beam forming filter can be generated by weighted summing or weighted averaging over all the eigenvectors with using an eigenvalue as a weight.

On the other hand, for the null beam forming filter $W\_N(\omega)$, a transformed matrix $V'(\omega)$ is first calculated by Equation [4.2] using the matrix $V(\omega)$ formed by the eigenvectors $V\_1(\omega)$ to $V\_n(\omega)$ described above in Equation [2.4] and the diagonal matrix $D(\omega)$ formed by the eigenvalues described above in Equation [2.5].

One of the rows of the transformed matrix $V'(\omega)$ is used as the null beam forming filter $W\_N(\omega)$. Equation [4.2] is identical to the equation obtained by multiplying the covariance matrix $R(\omega)$ described above with reference to Equation [2.2] by $-\frac{1}{2}$. When each row of the transformed matrix $V'(\omega)$ is considered as the spatial filter, the null beam is formed in all of the sound sources within the block.

3. Configuration and Processing of Sound Signal Processing Apparatus

Next, the configuration and the process of the sound signal processing apparatus will be described.

The configuration and the process of the sound signal processing apparatus will be described with reference to FIGS. 10 to 14.

Figure 10:
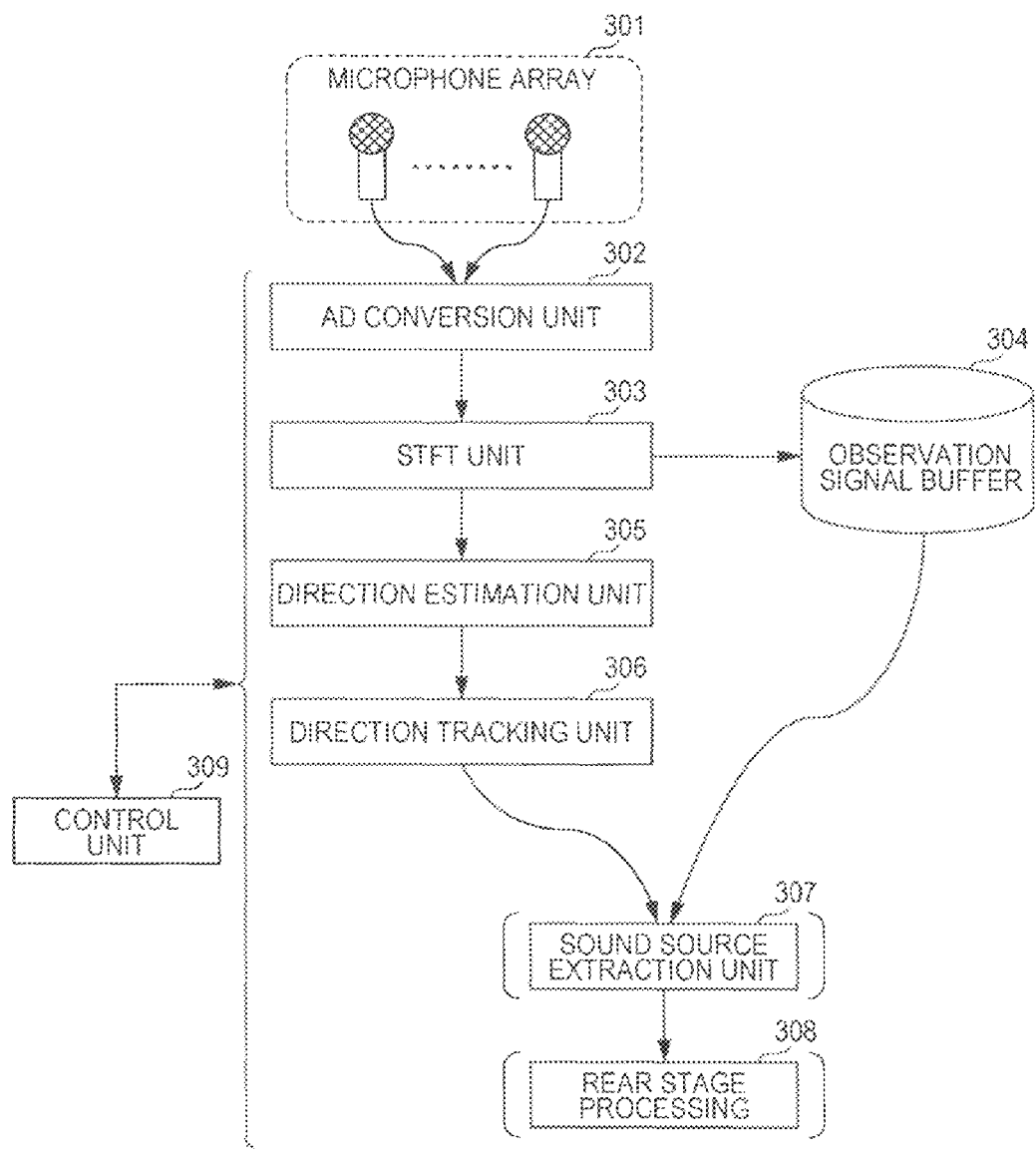
FIG. 10 is a diagram illustrating the general configuration of the sound signal processing apparatus.

FIG. 10 is a diagram illustrating the general configuration of the sound signal processing apparatus. FIGS. 11 to 14 are diagrams illustrating the details of each module.

3-1. Entire Configuration and Process of Sound Signal Processing Apparatus

First, the general configuration of the sound signal processing apparatus will be described with reference to FIG. 10.

Multi-channel sound data obtained when sound signals are received by a microphone array 301 are converted into digital signals by an AD conversion unit 302. The data is referred to as an observation signal (of a time domain).

Next, the STFT unit 303 transforms the observation signal into a signal of a time-frequency domain by applying the short-time Fourier transform (STFT). The observation signal of the time-frequency domain is transmitted to an observation signal buffer 304 and a direction estimation unit 305. Further, a specific processing example of the short-time Fourier transform (STFT) will be described below with reference to FIGS. 16A and 16B.

The observation signal buffer 304 accumulates the observation signals for a predetermined time (the number of frames). The accumulated observation signals are used to obtain sound data corresponding to one utterance in which a start time and an end time of the detected utterance section are combined or are used to obtain the result obtained by extracting the sound arriving in a predetermined direction using the direction of the section.

The direction estimation unit 305 divides the observation signal into blocks with a predetermined length and detects points corresponding to the sound source direction in the respective blocks. That is, the direction estimation unit 305 is the module that generates the data described above with reference to FIGS. 1B and 1C. The details thereof will be described below.

When the direction points have nearly the same direction between the plurality of continuous blocks, the direction tracking unit 306 connects the direction points and detects the connected direction points as the utterance section. That is, the direction tracking unit 306 is the module that generates the data described above with the reference FIG. 1D. The details thereof will be described below.

The output of direction tracking is the utterance section, that is, an utterance start time, an utterance end time, and an utterance direction (sound source direction). In other words, when the utterance start time, the utterance end time, and the utterance direction overlap in a plurality of sections, a plurality of sounds are mixed in the sections. Accordingly, when a clear sound source in which sounds are not mixed is necessary (for example, when the embodiment of the present technique is used at the former stage of speech recognition), a sound extraction unit 307 is provided.

The sound extraction unit 307 extracts a predetermined sound or the like using the observation signal, the sound source direction, or the like corresponding to the utterance section. The embodiment of the technique such as beam forming according to the related art can be used in this module.

The sound data corresponding to the utterance section is transmitted to a process execution unit 308 at the rear stage, if necessary. An example of the process execution unit is a voice recognizer. Further, the voice recognizer can have a voice section detection function, but may not have the voice section detection function. In many cases, the voice recognizer includes an STFT to extract a voice feature amount. When the voice recognizer is combined in the embodiment of the present technique, the STFT of the voice recognizer may not be provided.

Each module shown in FIG. 10 is controlled by a control unit 309.

3-2. Configuration and Process of Direction Estimation Unit of Sound Signal Processing Apparatus Next, the direction estimation unit 305 among the modules shown in FIG. 10 will be described in detail with reference to FIG. 11.

The direction estimation unit 305 inputs the observation signal 321 of the time-frequency domain transmitted from the STFT unit 304, and generates and outputs direction point information 327.

Figure 11:
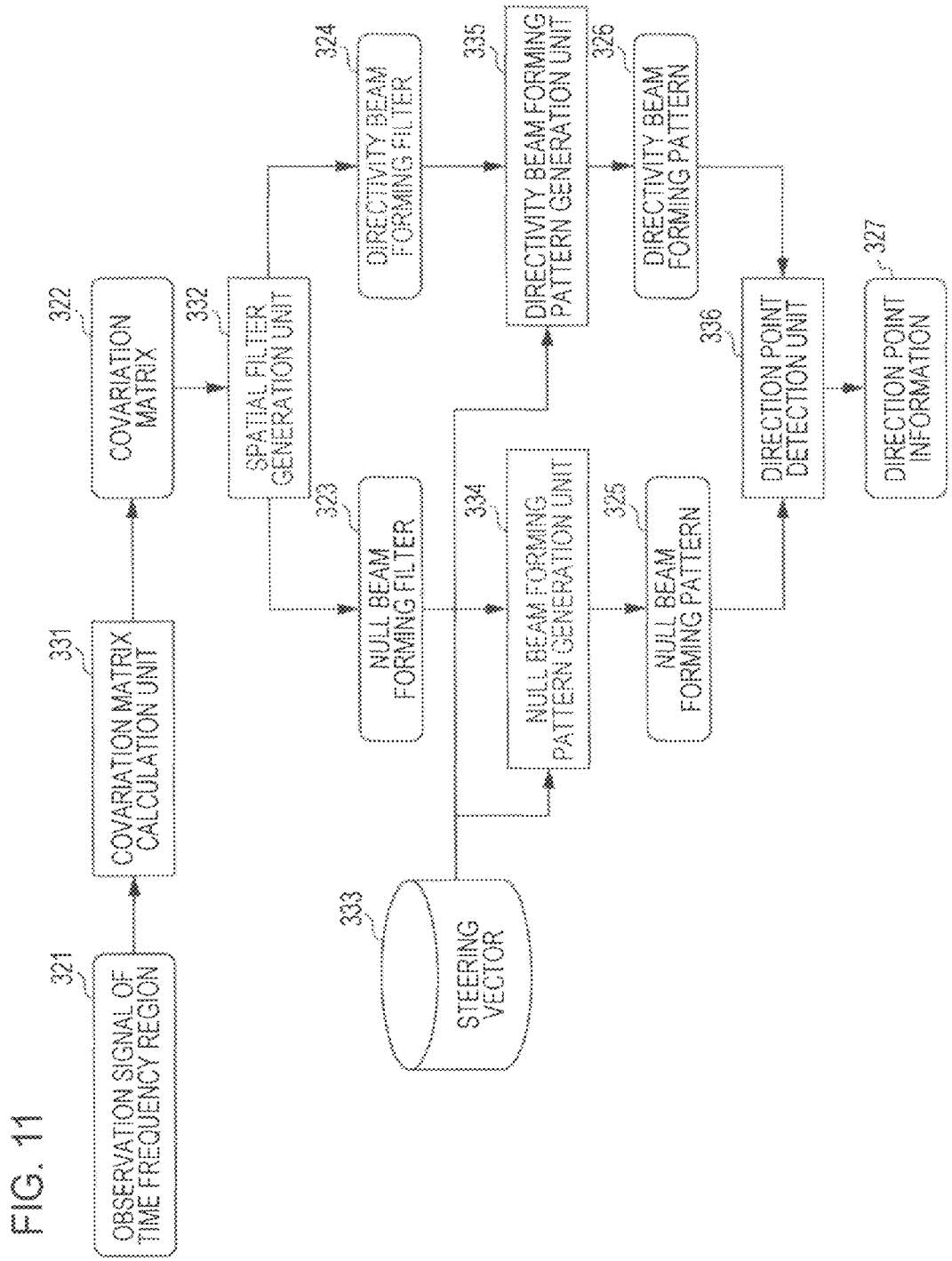
FIG. 11 is a diagram illustrating the details of a direction estimation unit of modules shown in FIG. 10.

In the direction estimation unit 305, a covariance matrix calculation unit 331 shown in FIG. 11 first calculates a covariance matrix 322 from the observation signal corresponding to the plurality of frames input from the STFT unit 304. An example of the covariance matrix 322 is a covariance matrix $R(\omega)$ shown in Equation [2.3] described above.

A spatial filter generation unit 332 inputs the covariation matrix 322 and generates two kinds of spatial filters from the covariance matrix 322. One of the spatial filters is a null beam forming filter 323 and the other thereof is a directivity beam forming filter 324.

Examples of the null beam forming filter 323 and the directivity beam forming filter 324 are the null beam forming filter $W\_N(\omega)$ shown in Equation [3.4] described above and the directivity beam forming filter $W\_D(\omega)$ shown in Equation [3.7] described above. When the spatial filters are generated, the spatial filter may be generated using Equation [4.1] and Equation [4.2] described in the article of "2-3. New Null Beam Forming filter and Directivity beam forming filter."

A storage unit 333 storing the steering vector is a storage unit that calculates the phase differences of the signals arriving in various directions in advance by Equation [3.3] and the like described above and stores the calculation result. The angle θ in Equation [3.3] is changed by cutting a one-round angle (for example, $-\pi$ to $+\pi$ in FIG. 8) at the interval of a predetermined step width (for example, 5°). When the microphones are arrayed in a straight line, the angle θ may be changed by half of the one-round angle in consideration of the symmetry of the directivity characteristic.

Figure 2:
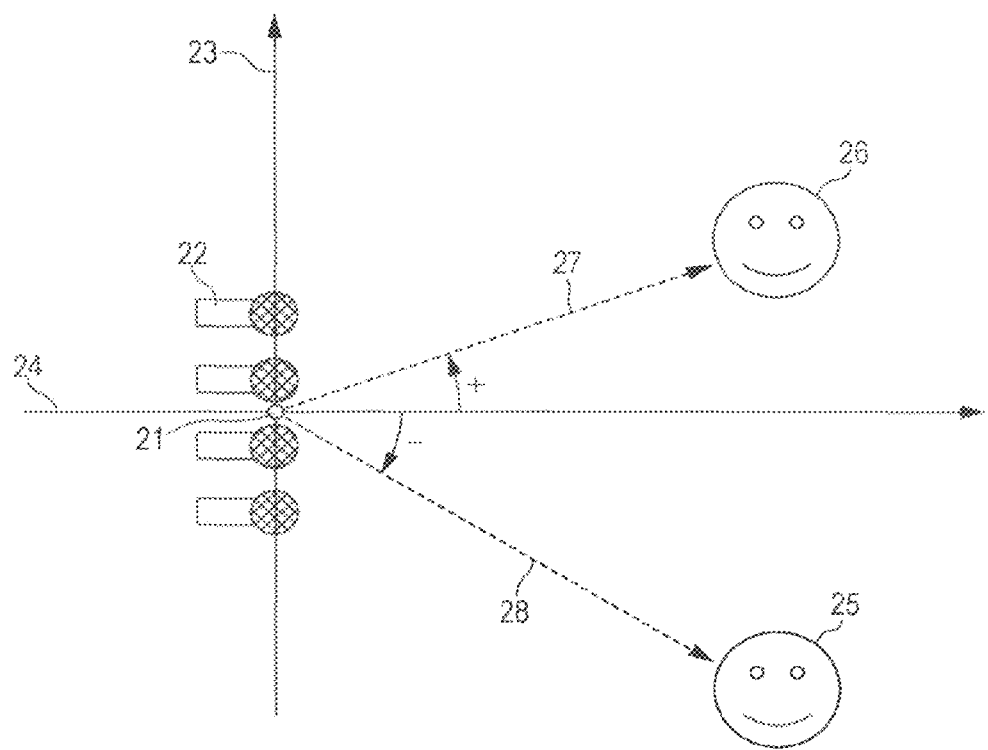
FIG. 2 is a diagram illustrating the recording environment of observation signals used to generate a spatial filter (FIG. 3) in which a null beam is directed in a sound source direction.

For example, when the microphones are arrayed as in FIG. 2, the directivity characteristic of the spatial filter is symmetric with respect to the vertical axis 23 parallel to the array of the microphones. Therefore, the angle θ may be changed with the predetermined step width from $-\pi/2$ (the opposite direction of the axis 23) to $+\pi/2$ (the direction of the axis 23.

Next, a null beam forming pattern generation unit 334 generates a null beam forming pattern 325 by allowing the null beam forming filter 323 to operate the steering vector.

Likewise, a directivity beam forming pattern generation unit 335 generates a directivity beam forming pattern 326 by allowing the directivity beam forming filter 324 to operate the steering vector.

For example, the null beam forming pattern is a null beam forming pattern $P\_N(\theta)$ shown in Equation [3.6] described above and the directivity beam forming pattern is a directivity beam forming pattern $P\_D(\theta)$ shown in Equation [3.9] described above.

Finally, a direction point detection unit 336 detects points corresponding to the sound source direction using both the null beam forming pattern 325 and the directivity beam forming pattern 326. The detection result is output as direction point information 327.

Since the maximum n–1 null beams can be formed from n microphones, the number of direction points obtained from one block is the maximum n–1.

The direction point information 327 output from the direction estimation unit 305 is supplied to the direction tracking unit 306 shown in FIG. 10.

The direction point information 327 output from the direction estimation unit 305 includes not only direction information indicating a direction in which the sound source is estimated but also information used to distinguish each direction point between the "strong direction point" and the "weak direction point." Specifically, the direction point information 327 is information that includes partial data of the values used to determine whether a point is a direction point.

A specific example of the direction point information 327 output from the direction estimation unit 305 will be described with reference to FIG. 12.

Figure 12:
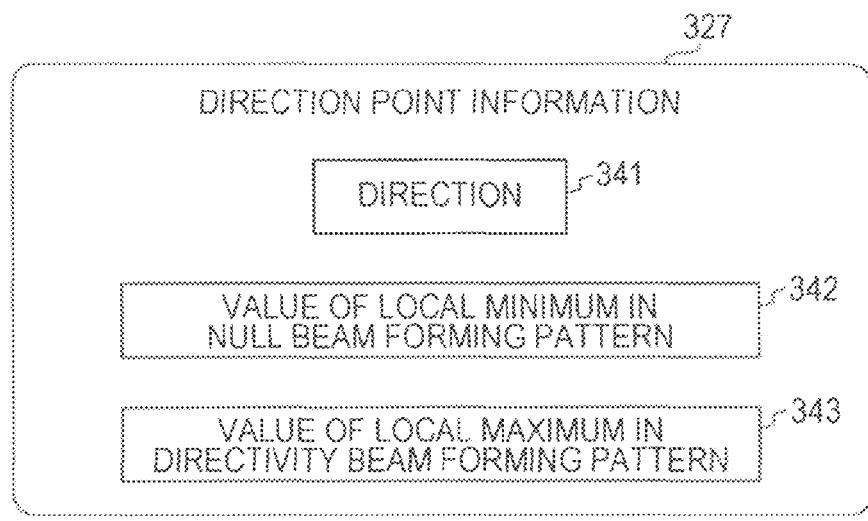
FIG. 12 is a diagram illustrating a specific example of direction point information output from the direction estimation unit.

FIG. 12 is a diagram illustrating an example of the configuration data of one piece of direction point information 327.

As shown in FIG. 12, the direction point information 327 includes:

(a) direction (θ) 341 of a direction point;
(b) a value 342 of the local minimum of a null beam forming filter; and
(c) a value 343 of the local maximum of a directivity beam forming filter.

The data of the items (b) and (c) are used as data which are used to determine a determination condition (sixth condition) for the direction point described above, that is, (Sixth Condition) "The value of the local minimum of the null beam forming pattern is smaller than the value of the local maximum of the directivity beam forming pattern corresponding to this local minimum."

3-3. Configuration and Process of Direction Tracking Unit of Sound Signal Processing Apparatus Next, the configuration and the process of the direction tracking unit 306 of the sound signal processing apparatus shown in FIG. 10 will be described with reference to FIG. 13.

The direction tracking unit 306 inputs the direction point information 327 output from the direction estimation unit 305 described with reference to FIGS. 11 and 12, and generates and outputs defined-section information 361 which is section information.

Figure 13:
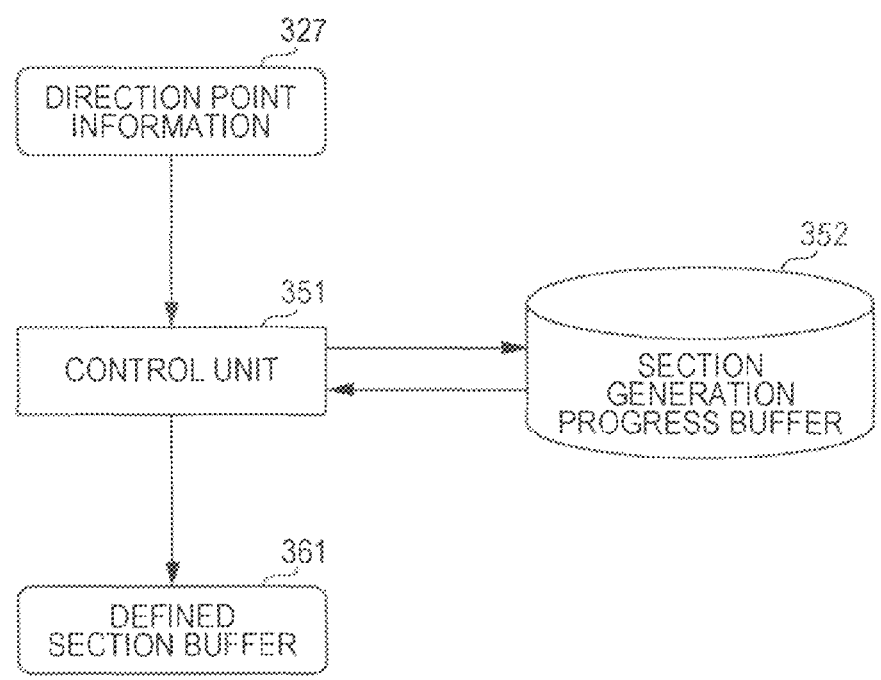
FIG. 13 is a diagram illustrating the configuration and the process of a direction tracking unit of the sound signal processing apparatus shown in FIG. 10.

The direction point information 327 shown in FIG. 13 is direction point information which is included in one block (which is the block described with reference to FIGS. 1A to 1D and 6) output from the direction estimation unit 305. The direction point information 327 includes the information described with reference to FIG. 12.

The direction point information 327 is input to a control unit 351 of the direction tracking unit 306. The control unit 351 is a module that controls the direction tracking unit. The control unit 351 generates a new section, extends a section of which the termination is not defined and which is thus being generated, and defines the section. The section being generated is stored in the section generation progress buffer 352.

When there is the section of which the termination is defined among the sections stored in a section generation progress buffer 352, this section is extracted from the section generation progress buffer 352 and is output as the defined-section information 361, that is, section information.

The section being generated by the direction tracking unit 306 and the defined-section information include information regarding various parameters defining a section.

An example of the configuration data of the section information generated by the direction tracking unit 306 will be described with reference to FIG. 14.

Figure 14:
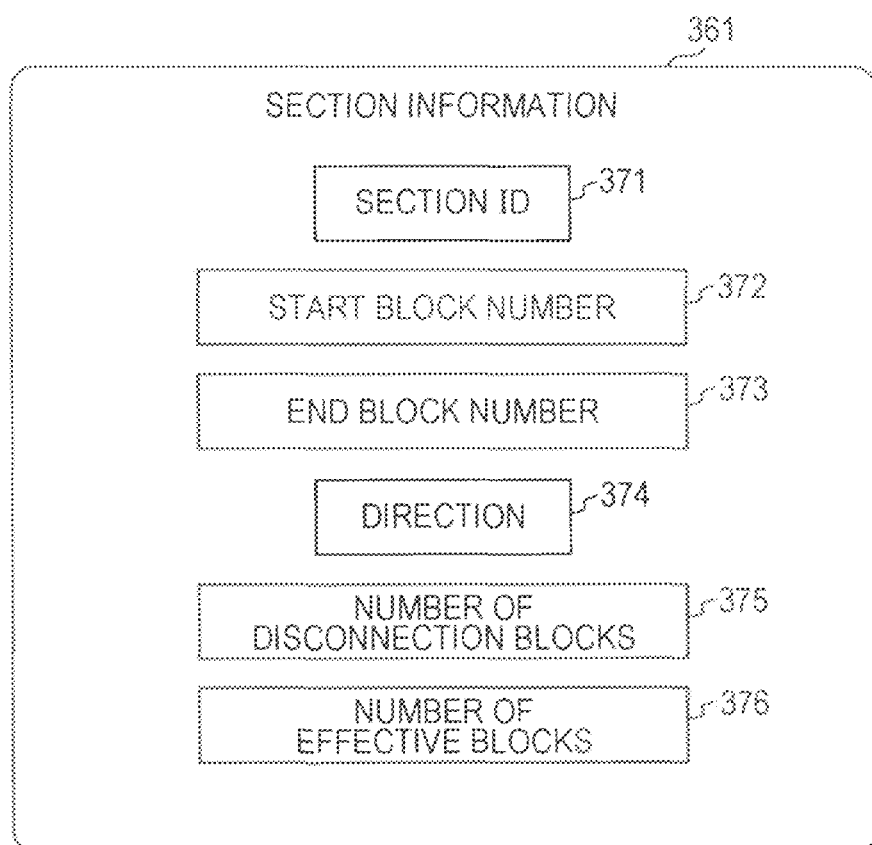
FIG. 14 is a diagram illustrating an example of configuration data of section information generated by the direction tracking unit.

FIG. 14 is a diagram illustrating an example of the configuration data of the section information corresponding to one section. The section information is section information regarding the defined section or section information (which is stored in the section generation progress buffer 352) corresponding to a section being generated.

A section ID 371 is an identifier (number) uniquely attached to each section. A start block number 372 is the number of the block (the block described with reference to FIGS. 1A to 1D and 6) corresponding to the start position of the section. Further, instead of the block number, a frame number of the STFT or a genuine time may be used.

An end block number 373 is the number of the block corresponding to the end of the section. The end block number may be a frame number or a time, like the start block number. Since the termination is not defined in the section being generated, a value indicating "undefined" is stored therein.

A direction 374 is a sound source direction corresponding to the section. A direction calculated at that time is stored in the section being generated.

The number of discontinuous blocks 375 is a value which indicates how many times the block, in which there is no direction point near the sound source direction defined as the direction 374, continues. This value is used during the generation of the section. In the tracking, when the discontinuing length of the section is shorter than a predetermined value in spite of the fact that the direction points discontinue, the section is cut as one section without discontinuity. In order to realize this process, the discontinuous length is stored. When the discontinuing length exceeds the predetermined value, the section is defined.

The number of effective blocks 376 is the number of blocks (hereinafter, referred to as "effective blocks") in which the direction point is present within the section.

For example, in the section 276 shown in FIG. 9, the number of effective blocks is ten (there is a block in which ten direction points from the direction points 281 to 274 are detected).

The reason for retaining this value is to prevent the erroneous detection of the section. A ratio of the effective blocks is calculated using the number of blocks of the section (which can be calculated using the start block number 372 and the end block number 373) and the number of effective blocks. When the value of the ratio is small (that is, when the effective blocks are sparse), there is a high possibility that the section is a false section in which the erroneously detected direction points are connected to each other, thereby rejecting this section.

4. Processing Sequence Executed by Sound Signal Processing Apparatus

Next, a processing sequence executed by the sound signal processing apparatus will be described with reference to the flowchart shown in FIG. 15 and the subsequent drawings.

Figure 15:
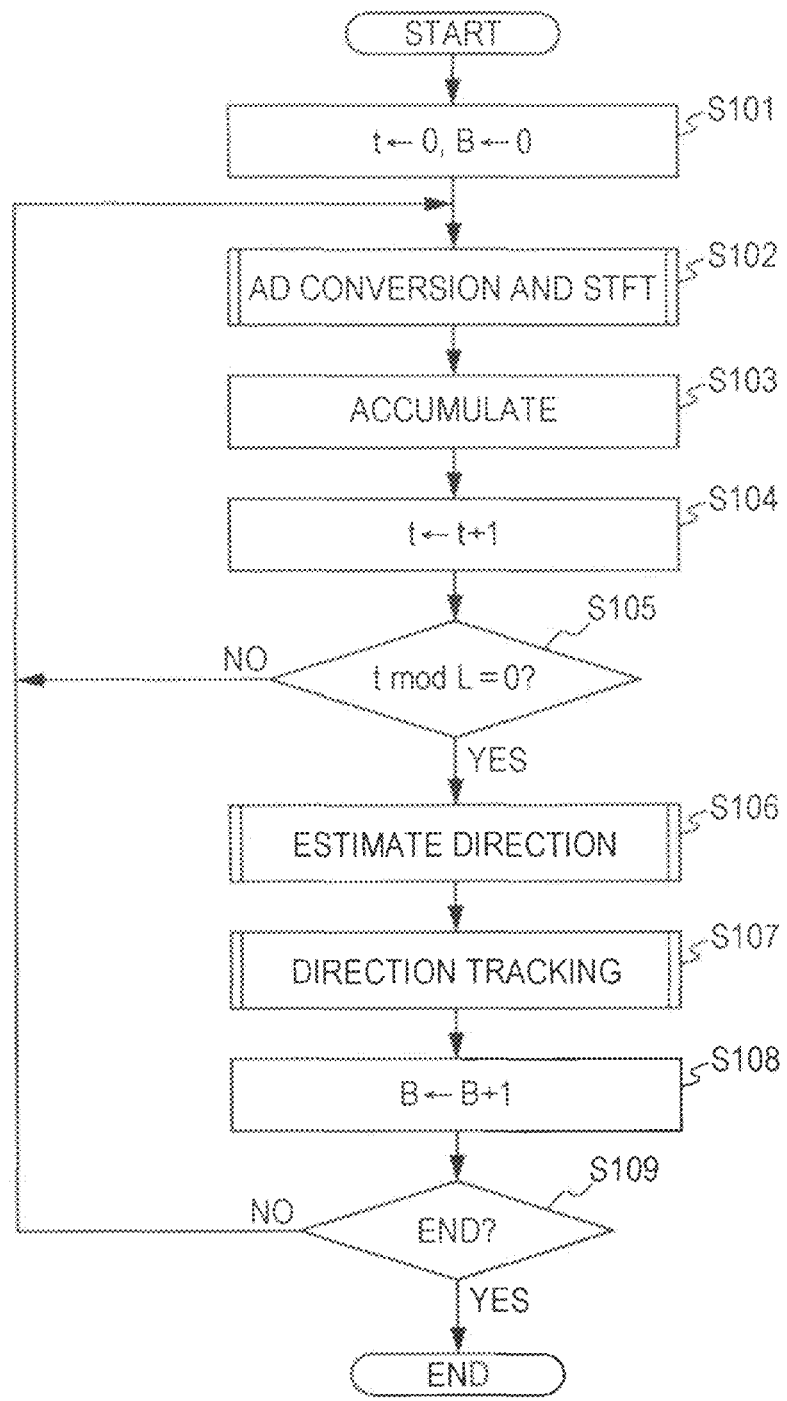
FIG. 15 is a flowchart of a general process executed in the sound signal processing apparatus.

FIG. 15 is a flowchart illustrating the general process executed by the sound signal processing apparatus. The steps of the flowchart shown in FIG. 15 will be described.

First, in step S101, initial setting is executed such that a variable t indicating the number of a frame (which is generated by the STFT) is set to 0 and a variable B indicating the number of a block (which is the block described with reference to FIGS. 1A to 1D, 6, and the like) is set to 0. The length of the block is set to a value sufficiently shorter than the length of a normal utterance. For example, the length of the block is set to $\frac{1}{10}$ seconds or $\frac{1}{8}$ seconds.

This setting is executed by, for example, the control unit 309 of the sound signal processing apparatus having the configuration shown in FIG. 10.

Next, in step S102, the sound signals input from, for example, the microphone array 301 shown in FIG. 10 are subjected to AD conversion and an STFT process.

The AD conversion unit 302 and the STFT unit 303 shown in FIG. 10 execute the AD conversion and the STFT process, respectively.

The AD conversion unit 302 converts the analog sound signal input into the microphone into a digital signal.

The STFT unit 303 converts the digital signal into a signal (spectrum) of a time-frequency domain through the short-time Fourier transform (STFT).

The sound signal may be input from a file, a network, or the like instead of the microphone shown in FIG. 10, if necessary.

The short-time Fourier transform (STFT) executed by the STFT unit 303 will be described below in detail.

For example, in the setting shown in FIG. 10 according to the embodiment, the AD conversion or the SIFT process is executed by the number of channels, since a plurality of input channels (the number of microphones) is present. Hereinafter, an observation signal with a channel k, a frequency bin $\omega$, a frame t is expressed as $X_k(\omega, t)$ (which corresponds to Equation [2.1] or the like described above).

On the assumption that l (which is a lower-case letter of L) is the number of points of the SIFT, the number of frequency bins M per 1 channels can be calculated by Equation "$M=\frac{1}{2}+1$."

Step S103 is an accumulation step. The accumulation step is a step of accumulating the observation signals transformed in the time-frequency domain through the SIFT for a predetermined time (for example, 10 seconds). In other words, on the assumption that T is the number of frames corresponding to the time, the observation signals corresponding to T continuous frames are accumulated in the observation signal buffer 304 shown in FIG. 10. Since a frame number F and frame data (spectrum) can be made to correspond to each other inside a buffer, the data of a predetermined frame number can be extracted later.

Next, in step S104, an update process of adding +1 to t is executed as a process of updating the frame number t.

In the process of step S105, the condition in which the processes of step S106 and the subsequent steps are executed once on L frames is branched. That is, only when the frame number t is divided by a frequency L and the remainder is 0, the process proceeds to step S106. Otherwise, the processes of step S102 and the subsequent steps are repeated.

When the processes of step S102 to step S104 are executed the number of times corresponding to the L frames, the process proceeds to step S106.

The process of step S106 is a process of obtaining the direction points from the covariance matrix of the observation signal. This process is executed by the direction estimation unit 305 shown in FIG. 10. That is, as described with reference to FIG. 11, the process is executed as a process of generating the direction point information formed by the data shown in FIG. 12 based on the observation signal of the time-frequency domain generated by the STFT unit. The details of the process will be described later.

The process of step S107 is a process of obtaining the utterance section from the direction points obtained in the direction estimation process of step S106. This process is executed by the direction tracking unit 306 shown in FIG. 10. That is, as described with reference to FIG. 13, the process is executed as a process of generating the speech section information formed by the data shown in FIG. 14 based on the direction point information generated by the direction estimation unit. The details of the process will be described later.

Next, in step S108, the block number B is updated. That is, an update process of adding +1 to the block number B is executed.

Finally, in step S109, a branching process is executed to determine whether the process continues. When the process continues, the process returns to step S102. When the process does not continue, the process ends.

Next, the short-time Fourier transform (STFT) process executed in step S102 by the STFT unit 303 shown in FIG. 10 will be described in detail with reference to FIGS. 16A and 16B.

Figure 16:
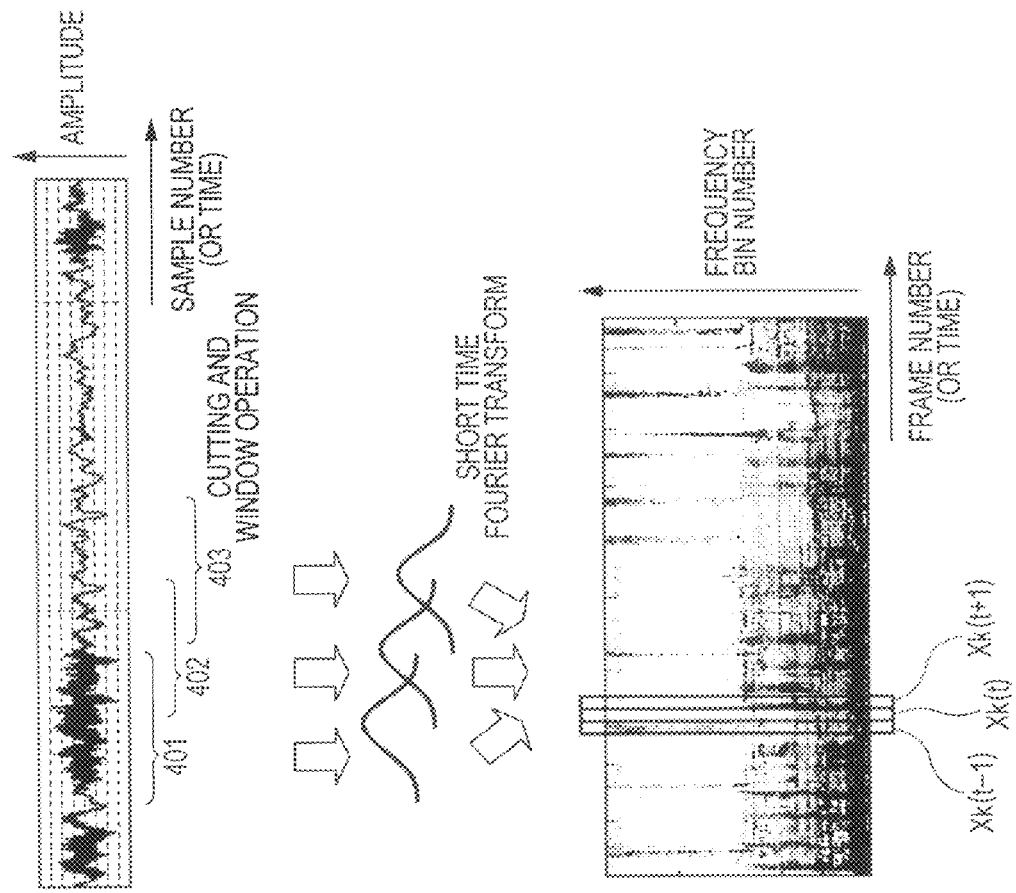
FIGS. 16A and 16B are diagrams illustrating the details of a short-time Fourier transform (SIFT) process performed by an SIFT unit shown in FIG. 10.

The waveform x_k(*) of an observation signal shown in FIG. 16A is the waveform x_k(*) of an observation signal observed in a k-th microphone in the microphone array 301 formed by n microphones configured as the voice input unit of the sound signal processing apparatus shown in FIG. 10.

A window function such as a Hanning window or a Hamming window is operated to frames 401 to 403 which are cut data cut with a constant length from the observation signal. The cut unit is referred to as a frame. A spectrum Xk(t) (where t is a frame number) which is data of a frequency domain is obtained by executing the short-time Fourier transform on the data corresponding to one frame.

The frames 401 to 403 shown in the drawing may overlap each other between the cut frames and spectrums Xk(t−1) to Xk(t+1) of the continuous frames can be smoothly changed by overlapping the frames. Arranging the spectrums in the order of the frame numbers is referred to as spectrogram. Data shown in FIG. 16B is an example of the spectrogram. The spectrum Xk(t) is a vector of the number of elements M and an ω-th element is expressed as Xk (ω, t).

Figure 17:
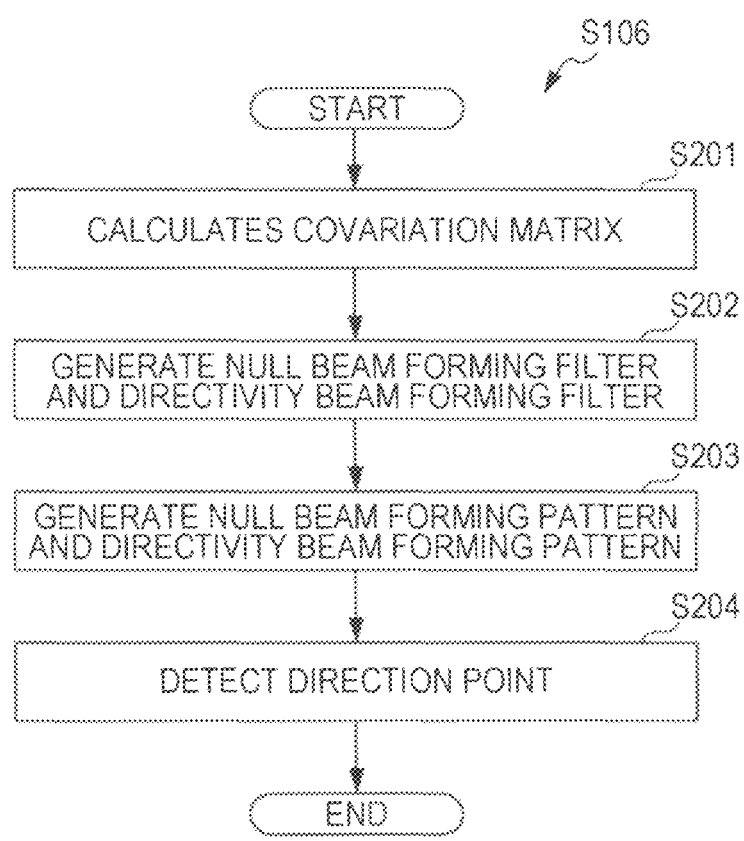
FIG. 17 is a flowchart illustrating the detailed sequence of a direction estimation process performed by a direction estimation unit shown in FIG. 10.

Next, the detailed sequence of the direction estimation process executed in step S106 by the direction estimation unit 305 shown in FIG. 10 will be described with reference to the flowchart shown in FIG. 17.

The direction estimation process, which is the process described above with reference to FIG. 11, is executed as a process of generating the direction point information formed from the data shown in FIG. 12 based on the observation signal of the time-frequency domain generated by the STFT unit.

A process of each step of the flowchart shown in FIG. 17 will be described in comparison to the configuration shown in FIG. 11.

In step S201, the covariation matrix of the observation signal is calculated. This process is performed by the covariation matrix calculation unit 331 shown in FIG. 11. The covariation matrix of the observation signal is calculated based on the observation signal of the time-frequency domain generated by the STFT unit.

The covariation matrix is calculated by Equation [2.2] described above.

In Equation [2.2], L' denotes the length (number of frames) of a block. A value different from the calculation frequency L (L of step S105 in the flowchart shown in FIG. 15) covariation matrix may be used as this value. For example, when L=8 and L'=16, the covariation matrix is calculated once per eight frames, but the covariation matrix itself is calculated from the observation signal corresponding to sixteen frames.

Next, in step S202, the null beam forming filter and the directivity beam forming filter are generated from the covariation matrix.

This process is performed by the spatial filter generation unit 332 shown in FIG. 11. The covariation matrix is input and two kinds of spatial filters are generated from the covariation matrix. One of the spatial filters is the null beam forming filter and the other thereof is the directivity beam forming filter.

For example, the null beam forming filter W_N(ω) shown in Equation [3.4] described above is generated and the directivity beam forming filter W_D(ω) shown in Equation [3.7] described above is generated. When the spatial filters are generated, the spatial filter may be generated using Equation [4.1] and Equation [4.2] described in the article of "2-3. New Null Beam Forming Filter and Directivity beam forming filter."

In step S203, the null beam forming pattern and the directivity beam forming pattern are generated based on the null beam forming filter and the directivity beam forming filter, respectively.

The null beam forming pattern generation unit 334 shown in FIG. 11 generates a null beam forming pattern by allowing the null beam forming filter to operate the steering vector.

Likewise, the directivity beam forming pattern generation unit 335 generates a directivity beam forming pattern by allowing the directivity beam forming filter to operate the steering vector.

The specific methods of generating the null beam forming pattern and the directivity beam forming pattern are the same as the methods described in detail in "2-1. Combined Configuration of Null Beam Forming Pattern and Directivity Beam Forming Pattern" and "2-3. New Null Beam Forming Filter and Directivity Beam Forming Filter."

For example, the null beam forming pattern is the null beam forming pattern P_N(θ) shown in Equation [3.6] described above and the directivity beam forming pattern is the directivity beam forming pattern P_D(θ) shown in Equation [3.9] described above.

Finally, in step S204, the direction points are detected using both the null beam forming pattern and the directivity beam forming pattern. The specific method has been described in detail above in the article of "2-2. Change in Direction Point Detection Condition Depending on Section State."

The direction points mentioned here include both the "strong direction points" and the "weak direction points." That is, the direction points satisfy at least the first to fifth conditions among the first to sixth conditions described in the article of "2-2. Change in Direction Point Detection Condition Depending on Section State."

Next, the detailed sequence of the direction tracking process of step S107 in the general processing flowchart shown in FIG. 15 will be described with reference to the flowchart shown in FIG. 18.

The direction tracking process of step S107 is executed by the direction tracking unit 306 shown in FIG. 10. As described above with reference to FIGS. 13 and 14, the direction tracking process is a process of inputting the direction point information output by the direction estimation unit 305 described with reference to FIGS. 11 and 12, generating and outputting the defined section information 361 which is the speech section information.

Figure 18:
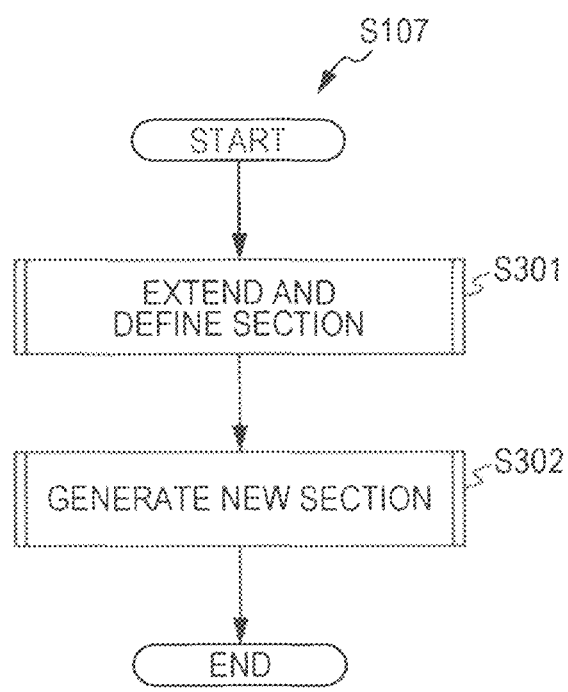
FIG. 18 is a flowchart illustrating the detailed sequence of a direction tracking process of step S107 of the general processing flowchart shown in FIG. 15.

As described in the flowchart shown in FIG. 18, the direction tracking process includes two processes, that is the "section extension and definition" process of step S301 and, the "new section generation" process of step S302.

One of the features according to the embodiment of the present technique is that the condition regarding the detection of the direction points in the beginning and the midway of a section can be changed. Specifically, in step S301, the "section extension and definition" process is executed using both the "strong direction points" and the "weak direction points." On the other hand, in step S302, the "new section generation" process is executed using only the "strong direction points."

The section extension and definition process of step S301 is a process on the section being generated, which is stored in the section generation progress buffer 352 shown in FIG. 13. First, the section being generated is extended or defined using the direction points newly detected in step S204 described with reference to the flowchart shown in FIG. 17. Then, the defined section is transmitted to the subsequent process (sound source extraction and the like). The details thereof will be described later.

The "section being generated" is a section in a state where the section is generated through the new section generation process of step S302 and is then defined.

The new section generation process of step S302 is a process of searching for the section in which the block being currently analyzed is the beginning. The details thereof will be described later.

Next, the detailed sequence of the "section extension and definition" process of step S301 of the flowchart shown in FIG. 18 will be described with reference to the flowchart shown in FIG. 19.

The "section extension and definition" process of step S301 is a process which is performed on the section data being generated, which is stored in the section generation progress buffer 352 shown in FIG. 13. Therefore, a loop is formed for the section being generated in step S401 to step S408 of the flowchart shown in FIG. 19. The processes of step S402 to step S407 are performed on the section being generated.

In step S402, it is examined whether the direction points are present near the section being generated. Here, the direction points include both the "strong direction points" and the "weak direction points."

Specifically, the "direction" (the "direction" 374 in the section information 361 shown in FIG. 14) in the section information being generated, which is generated by the direction tracking unit 306 and stored in the section generation progress buffer 352, is compared to the "direction" (the "direction" 341 in the direction point information 327 shown in FIG. 12) in the direction point information newly input from the direction estimation unit 305 by the direction tracking unit 306. When a difference between both the directions falls within a predetermined defined threshold value range (for example)±10°, it is determined that the direction points are present near the section.

When the direction points are present within the defined threshold value range, the result of the determination of step S402 is YES and thus the process proceeds to step S403.

The process of step S403 and step S404 are processes of extending the section. Specifically, processes of updating the section information are performed.

In step S403, the number of effective blocks in the section information is updated. That is, the number of effective blocks 376 in the section information 361 shown in FIG. 14 is added by +1 and 0 is substituted for the number of discontinuous blocks 375.

Next, in step S404, a mean of the directions from the beginning of the section to the block being currently analyzed is calculated. Specifically, direction data A is updated as a value stored in the direction before the updating, that is, the "direction" 374 in the section information 361 shown in FIG. 14.

On the assumption that A is the direction data, B is the number of effective blocks (value after the updating by addition of +1 in step S403), C is the "direction" (the "direction" 341 in the direction point information 327 shown in FIG. 12) in the direction point information newly input from the direction estimation unit 305 by the direction tracking unit 306, the direction A is updated by the following equation:

$$A \leftarrow \{(B-1)A+C\}/B.$$

The above equation corresponds to an equation for calculating the mean of the directions by adding the newly input direction C to the direction data A set in the section information being generated and subtracting the number of blocks B from the sum.

On the other hand, when it is determined that the direction points are not present near the section in step S402, the result of the determination of step S402 is NO and the process proceeds to step S405.

In this case, the direction points continuous in the section information being generated discontinue. When the direction points discontinue for a given time, the termination of the section is determined.

For this process, in step S405, an update process of adding +1 to the number of discontinuous blocks 375 included in the section information 361 shown in FIG. 14 is performed.

In step S406, it is determined whether the updated number of discontinuous blocks 375 is equal to or greater than a predetermined value (for example, three blocks) defined in advance.

When it is determined that the updated number of discontinuous blocks 375 is equal to or greater than the predetermined value is step S406, the result of the determination of step S406 is YES and thus the process proceeds to step S407.

In step S407, the termination of the section is considered to be defined and a section "output and rejection" process is performed. The details thereof will be described later.

On the other hand, when it is determined that the updated number of discontinuous blocks 375 is equal to or greater than the predetermined value is step S406, the result of the determination of step S406 is NO and thus the process proceeds to step S408 without execution of the process of step S407.

When step S401 to step S408 are performed on all of the sections being generated, the loop ends and the process proceeds to "multi-adoption checking" of step S409.

In step S409, it is examined whether one direction point is adopted in two or more sections being generated. When one direction point is adopted in the plurality of sections, only the longest section remains among the plurality of sections and the other sections are deleted. That is, a process of deleting the data input into the section generation progress buffer 352 shown in FIG. 13 is performed.

The reason for performing the multi-adoption checking will be described with reference to FIGS. 20A and 20B.

FIG. 20A is similar to FIG. 1D. FIG. 20A shows a plurality of direction points 501 to 503 detected in each block and speech sections 504 and 505 being generated, which are set based on the direction points. Further, the block sections shown in FIGS. 1C and 6 are not illustrated.

In FIG. 20A, since the direction points 501 and 502 are distant from each other by a value greater than a predetermined value as a threshold distance of which a direction is defined in advance, it is assumed that the direction points 501 and 502 are not directly connected to each other as constituent elements of the section from the same sound source. On the contrary, since a space between the direction points 501 and 503 and a space between the direction points 502 and 503 are shorter than the predetermined value which is the threshold value, the direction points 501 and 503 can be connected to each other and the direction points 502 and 503 can be connected to each other.

That is, the direction point 503 is adopted as a "vicinity direction point" both in the section 504 being generated, which includes the direction point 501, in the section 505 being generated, which includes the direction point 502. In some cases, one newly observed direction point can be set as direction points of a plurality of different speech sections. This phenomenon is called multi-adoption. When the sections being generated remain in the occurrence of the multi-adoption, direction points located on the right side of the same direction point 506 are connected to each other in both the sections in the subsequent tracking, as shown in FIG. 20B.

As a consequence, a plurality of sections in one utterance, that is, sections 507 and 508 shown in FIG. 20B are set. This process is called section multi-detection.

There is a high possibility that the plurality of sections set in one utterance may be erroneously detected sections. Accordingly, a countermeasure for preventing the section multi-detection is necessary.

In order to prevent the section multi-detection, when the multi-adoption of the direction point occurs, a process is performed such that only the longest section (maximum section) remains among the sections including the direction point and the sections shorter than the longest section are deleted.

For example, the direction point 503 shown in FIG. 20A is a direction point of the multi-adoption type adopted in two sections, that is, the speech sections 504 and 505.

When the direction point 503 of the multi-adoption type is detected, the lengths of the plurality of speech sections including the direction point 503 of the multi-adoption type are compared to each other.

In the setting shown in FIG. 20A, the speech section 504 is longer than the speech section 505. In this case, the shorter speech section 505 is deleted. As a consequence, when the subsequent direction points are detected, the speech section 508 shown in FIG. 20B is not set and only the speech section 507 is set.

Alternatively, instead of deleting the shorter sections, the direction points included in the shorter sections are added (merged) to the longest section and a new direction of the section may be calculated again using all the direction points included in the longest section. For example, in FIG. 20A, the direction point 502 included in the speech section 505 is added to the speech section 504, and then the direction of the speech section 504 is calculated as the mean of the three direction points 501, 502, and 503.

When the shorter sections are just deleted in the case where a direction point of the multi-adoption type is present, there is a possibility that the section is rejected in step S407 due to a decrease in the ratio of the direction points to the number of blocks in the longest section. However, by merging the direction points, it is possible to prevent the unnecessary rejection caused due to the deletion of the shorter sections.

Next, the "section output and rejection" process of step S407 in the flowchart shown in FIG. 19, which is the detailed sequence of the "section extension and definition" process of step S301 in the flowchart shown in FIG. 18, will be described in detail with reference to the flowchart shown in FIG. 21.

An "output" process of the "section output and rejection" process of step S407 is an output process of transmitting the defined section to the subsequent processing units (for example, an execution unit and the like of the sound source extraction process). A "rejection" process is a process of determining that the section does not satisfy a predetermined condition defined in advance and deleting the section.

The process of each step in the flowchart shown in FIG. 21 will be described.

Figure 4A:
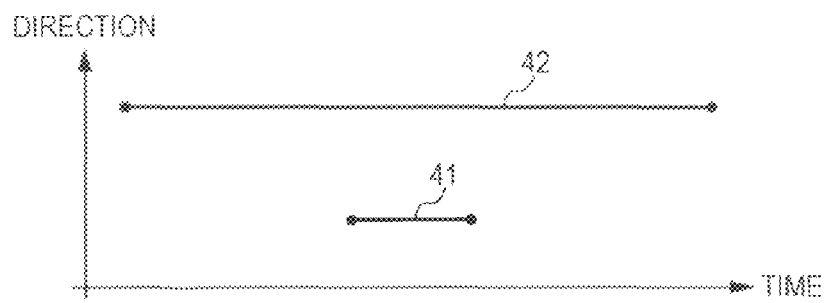
FIGS. 4A to 4C are diagrams for explaining problems when the number of sound sources is changed during utterance.
Figure 4B:
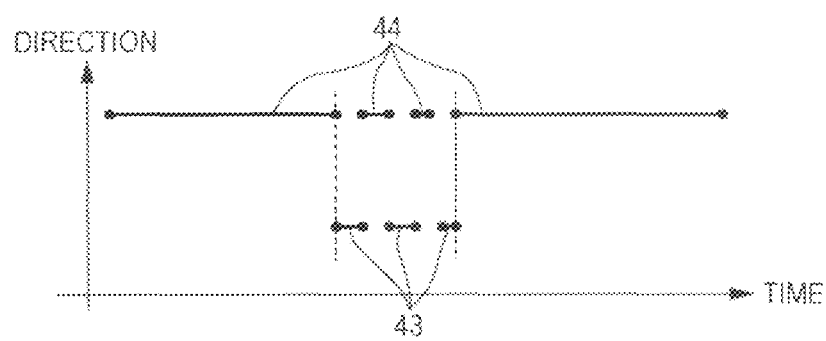
Figure 4C:
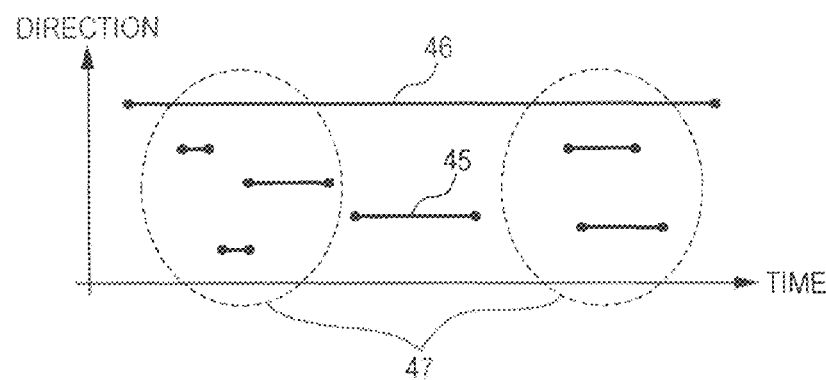

In step S501, the end block number is calculated and the value of the calculated end block number is recorded as the section information described with reference to FIGS. 4A to 4C, that is, the end block number 373 in the section information corresponding to the section being generated, which is stored in the section generation progress buffer 352 shown in FIG. 13.

Figure 19:
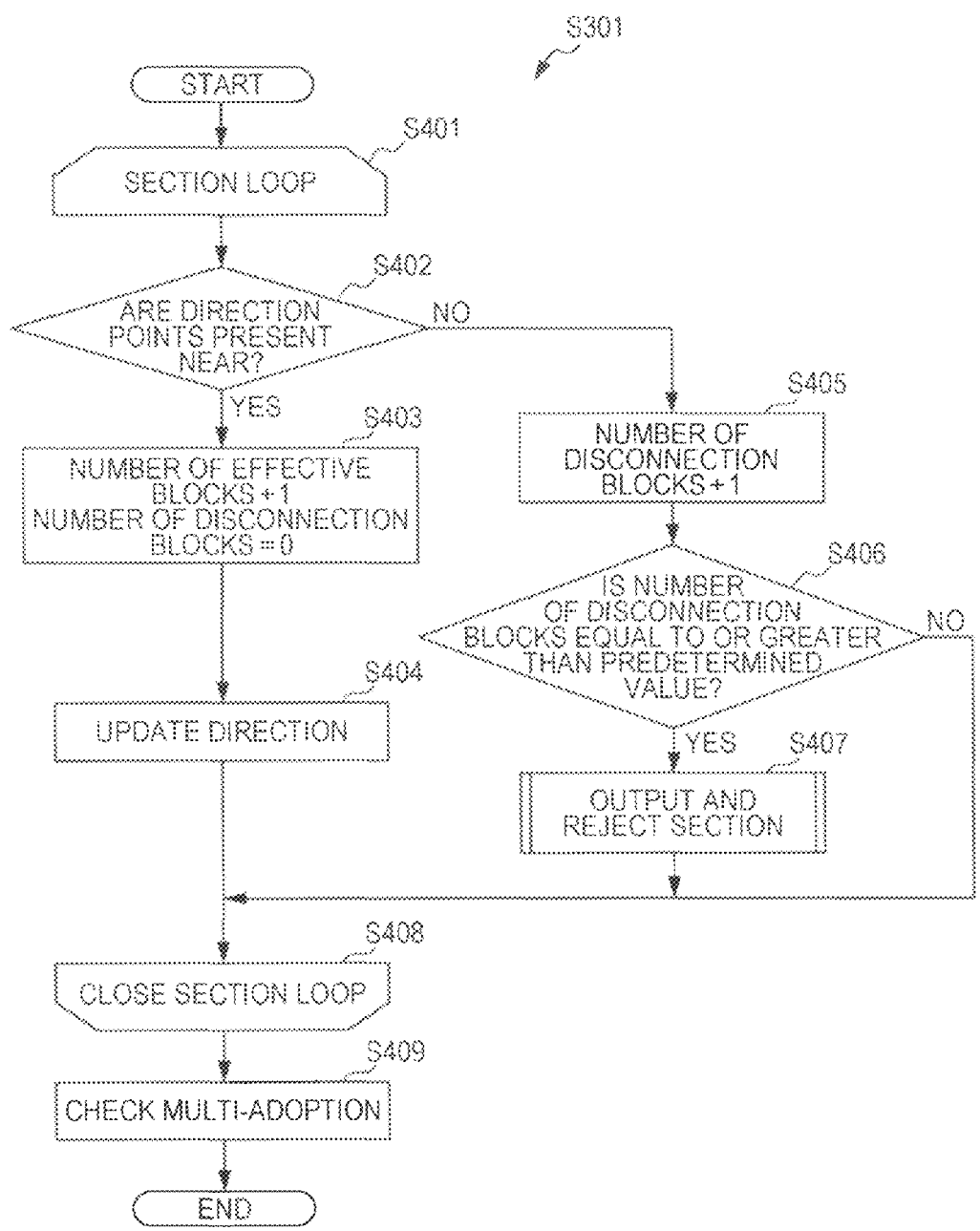
FIG. 19 is a flowchart illustrating the detailed sequence of a "section extension and definition" process of step S301 of the flowchart shown in FIG. 18.

On the assumption that B is the number of the block being currently analyzed and B_{discontinue} is a predetermined value as a threshold value for determining the number of discontinuous blocks in step S406 of the flowchart shown in FIG. 19, the end block number is calculated by the following equation:

$$\text{end block number} = B - B\_\{\text{discontinue}\}.$$

All of the conditions that the section has to satisfy are determined in step S502 to step S504. Only when all of the conditions are satisfied, the process proceeds to step S505 to perform a process of determining that the section is the effective section and outputting the effective section to a processing unit at the rear stage, such as a unit executing the sound source extraction process.

When it is determined that one of the conditions in step S502 to step S504 is not satisfied, a process is executed to determine that the section is not the effective section and reject the section in step S506 is executed, that is, a process is executed to delete the section information regarding the section being generated, which is stored until now in the section generation progress buffer 352 shown in FIG. 13.

Hereinafter, the determination process executed in step S502 to step S504 will be described. Further, the determination order of the respective conditions in step S502 to step S504 may be changed.

The process of step S502 is a process of determining whether the direction 374 (the direction 374 in the section information 361 shown in FIG. 14) retaining as the section information of the section being generated falls within a predetermined range defined in advance.

For example, when it is known that a targeted sound source (uttering person) is located only near 0° and the direction of the section is deviated from a range of −10° to +10°, the section is rejected. On the other hand, this determination is not executed when the targeted sound source is likely to be in all of the directions. That is, the determination process of step S502 is not executed.

In step S503, the length of the section is determined. By rejecting the section which is shorter than a predetermined value (for example, the section is shorter than 0.1 seconds), it is possible to prevent the erroneous detection of the section. Further, by rejecting the section which is longer than a predetermined value (for example, the section is longer than 10 seconds), it is possible to prevent a sound source generating small sound such as the sound of a cooling pan from being detected.

That is, only when the section falls within a predefined range, the section is determined to be effective. Further, the "range" applied to the determination condition is preferably set depending on a sound acquisition environment.

In step S504, the ratio of the effective blocks (blocks having the direction point) during the section is determined.

On the assumption that B_[begin} is the start block number (the start block number 372 in the section information shown in FIG. 14) of the section, B_{end} is the number of end blocks (the number of end blocks 375 in the section information shown in FIG. 14), and B_{valid} is the number of effective blocks (the number of effective blocks 376 in the section information shown in FIG. 14), the ratio of the effective blocks is calculated by the following equation:

$$\text{ratio of effective blocks} = B\_\{valid\}/(B\_\{end\} - B\_\{begin\}+1).$$

It is determined whether the ratio is equal to or greater than a predetermined value (for example, 0.5) defined in advance. When the ratio of the effective blocks is low, there is a high possibility that the section may be generated by connecting the erroneously detected direction points are connected in a skipping manner. By rejecting such a section, it is possible to prevent the erroneous detection of the section.

When all of the determinations of step S502 to step S504 are satisfied, the process proceeds to the "output" process of step S505. In the output process of step S505, the section information regarding the section being generated is deleted from the section generation progress buffer 352 shown in FIG. 13 and is supplied to the processing unit at the rear stage.

On the other hand, when any one of the determinations of step S502 to step S504 is not satisfied, the process proceeds to the "rejection" process of step S506. In the rejection process of step S506, the section is deleted from the section generation progress buffer 352 without the output of the section. That is, only the deletion process is executed.

Next, the detailed sequence of the "new section generation" process of step S302 in the flowchart shown in FIG. 18, which is the detailed sequence of the direction tracking process of step S107 in the general process flowchart shown in FIG. 15, will be described with reference to the flowchart shown in FIG. 22.

Figure 22:
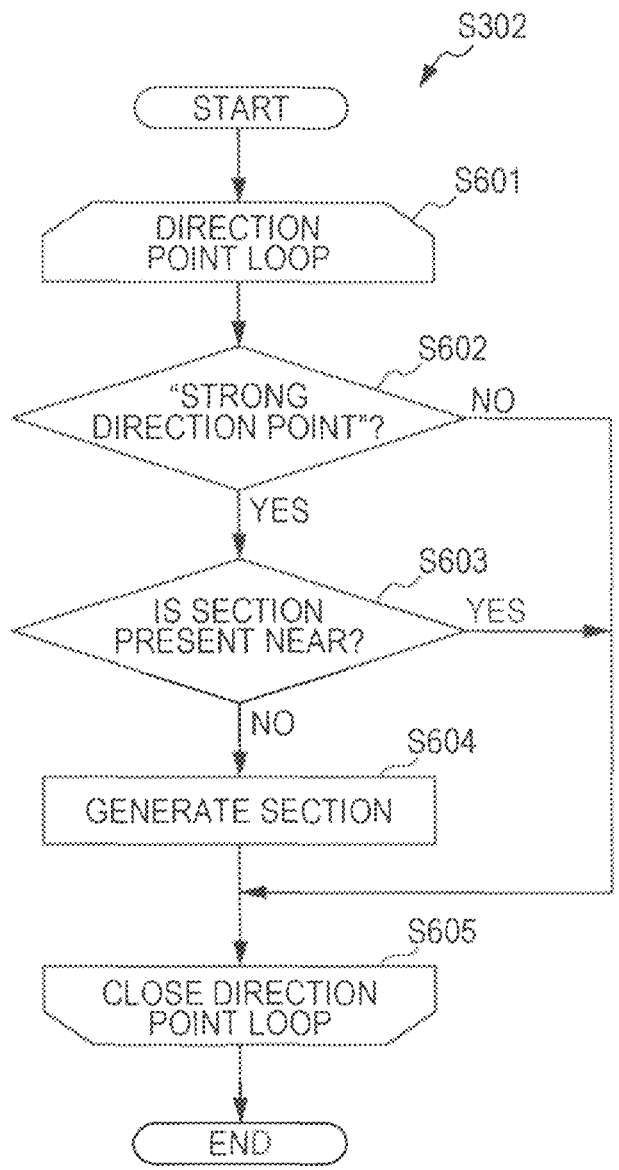
FIG. 22 is a flowchart illustrating the detailed sequence of a "new section generation" of step S302 of the flowchart shown in FIG. 18.

Step S601 to step S605 in the flowchart shown in FIG. 22 are a direction point loop executed for each direction point. In the embodiment of the present technique, since only the "strong direction points" among the direction points are targets for the beginning of the section, it is checked in step S602 whether the direction points to be executed are the "strong direction points." When the direction points are the "weak direction points", step S603 and step S604 are not executed.

In step S603, in regard to "strong direction points", it is checked whether the section being generated is present near the direction point to be executed. This determination process is the same as the process of step S402 described with reference to FIG. 19.

When the section being generated is not present near the direction point, it is determined that the direction point is the beginning point of the section and the process proceeds to a "section generation" process of step S604. On the other hand, when the section being generated is present near the direction point, the process of step S604 is not executed.

Further, since the section being generated is not present during the analysis of the initial block, the "strong direction point" of the initial block is normally the beginning point of the section.

In step S604, the section information described above with reference to FIG. 14 is generated and a predetermined value is substituted for each slot (the section ID 371 to the number of effective blocks 376). Hereinafter, the value substituted for each slot will be described.

A value obtained by adding +1 whenever the section is generated is substituted for the section ID 371. That is, 1 is substituted for the initially generated section, and then 2, 3, etc. are substituted for the subsequent sections.

The number of the block being currently analyzed is substituted for the start block number 372.

Since the termination of the section is not detected for the end block number 373 at this time, a value indicating "undefined" is substituted.

The direction (the direction 341 shown in FIG. 12) in the direction point information retaining the direction point to be executed is substituted for the direction 374.

Further, 0 is substituted for the number of discontinuous blocks 375.

Furthermore, 1 is substituted for the number of effective blocks 376.

When the processes of step S602 to step S604 are executed on all of the direction points within the block, the new section generation process ends.

5. Other Embodiments

Modified Examples

In the above-described embodiment, one exemplary basic configuration has been described.

Hereinafter, modified examples of the above-described basic embodiment will be described.

Modified Example 1

In the above-described embodiment, the sixth condition has been used as the direction point determination condition for distinguishing the "strong direction points" from the "weak direction points." That is, when the relationship of "the minimum value of the null beam forming pattern<the maximum value of the directivity beam forming pattern" is satisfied and the direction points are not the "strong direction points", it is determined that the direction points are the "weak direction points."

Another condition may be used as the condition for distinguishing the "strong direction points" from the "weak direction points."

For example, the fifth condition for considering the direction point as the direction point indicating the above-described sound source direction is satisfied, that is, (Fifth Condition) the determination condition based on a threshold value dynamically calculated from the minimum value of the null beam forming pattern in an immediately adjacent block group is satisfied (determination condition in accordance with a dynamic threshold value).

When the dynamic threshold value is calculated in the above condition, the parameter: a shown in Equation [1.7] described above is prepared by two methods and is set to α_{large} and α_{small}. Here, a relationship of "0<α{small}<α{large}<1" is satisfied.

The dynamic threshold value T_dynamic is calculated as two kinds of values by Equation [1.7] described above using the above-mentioned two parameters: α.

The dynamic threshold values are T_{tight} and T_{loose}. These dynamic threshold values are shown in Equations [5.1] and [5.2] below.

$$T_{tight} = \alpha_{large} P_{min} \quad [5.1]$$

$$T_{loose} = \alpha_{small} P_{min} \quad [5.2]$$

$$P_N(\theta_i) < T_{tight} \quad [5.3]$$

$$P_N(\theta_i) < T_{loose} \quad [5.4]$$

The above-described fifth condition is set as two kinds of conditions of Equations [5.3] and [5.4] by applying the two dynamic threshold values.

Since P_{min} has a negative value, Equation [5.3] is a strict condition. Accordingly, a direction point satisfying the first to fourth conditions and Equation [5.3] is referred to as a "strong direction point" and a direction point satisfying the first to fourth conditions and Equation [5.4] is referred to as "weak direction point."

The determination conditions of the "strong direction point" and the "weak direction point" may be applied.

Modified Example 2

Next, as Modified Example 2, a configuration will be described in which the process of detecting the speech section of the "method of using a single microphone" (that is, the method based on the "voice likeness") as the technique according to the related art introduced in "BACKGROUND" is combined with the process of detecting the speech section according to the above-described embodiment of the present technique. It is possible to detect the utterance section more accurately through the combination. An example of the configuration will be described with reference to FIG. 23.

Figure 23:
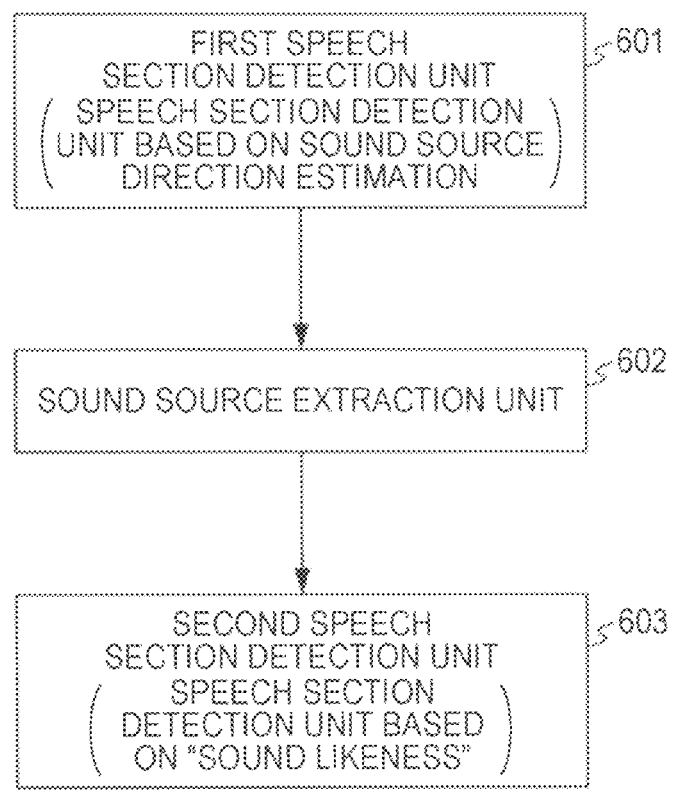
FIG. 23 is a diagram illustrating a configuration in which a speech section detection process based on "voice likeness" and a speech section detection process according to the embodiment of the present technique are combined.

In a sound signal processing apparatus shown in FIG. 23, a first speech section detection unit (a speech section detection unit based on the sound source direction estimation) 601 is a module that executes a process of detecting the speech section by the use of the method described in the embodiment. However, the first speech section detection unit 601 outputs section information in which margins are added to the front and rear of the detected section, since a sound source extraction unit 602 at the rear stage detects the speech section in more detail. That is, a longer section is output compared to a case where the first speech section detection unit 601 is used solely.

The sound source extraction unit 602 is a module that executes detailed section detection based on the speech section information input from the first speech section detection unit (the speech section detection unit based on the sound source direction estimation) 601. For example, the sound source from the corresponding direction is extracted from the section and the direction by the technique such as a beamformer according to the related art.

A second speech section detection unit (a speech section detection unit based on "voice likeness") 603 detailed section detection based on "voice likeness" on the output from the sound source extraction unit 602.

The advantages of combining the speech section detections of the both methods are as follows:

1. high accuracy of beginning and termination of section; and
2. rejection of sound source except for voice.

When the method based on the sound source direction estimation is compared to the method based on the "voice likeness", the advantage that the method based on the sound source direction estimation is strong to overwrite voices on each other can be obtained, whereas a problem may arise in that temporal granularity of the beginning and the termination of the section depends on the update frequency of the covariation matrix. Accordingly, it is possible to realize the speech section detection which is strong to overwrite the voices on each other and is minute in the temporal granularity by resolving the overwriting of the voices by extracting the sound source by the use of the section and the direction obtained by the method based on the sound source direction estimation and applying the speech section detection based on the "voice likeness" to the result.

Modified Example 3

In the generation of the directivity beam forming pattern, Equation [6.1] shown below can be used instead of Equation [3.8].

$$P_D(\omega, \theta) = \frac{1}{2} \log |S(\omega, \theta)^H R(\omega) S(\omega, \theta)| \quad [6.1]$$

$$Y(\omega, t, \theta) = S(\omega, \theta)^H X(\omega, t) \quad [6.2]$$

$$\langle |Y(\omega, t, \theta)|^2 \rangle_{t-L' < \tau \leq t} = S(\omega, \theta)^H \langle X(\omega, \tau) X(\omega, \tau)^H \rangle_{t-L' < \tau \leq t} S(\omega, \theta) \quad [6.3]$$

$$= S(\omega, \theta)^H R(\omega) S(\omega, \theta) \quad [6.4]$$

This equation is based on a delay-and-sum array. Hereinafter, this equation will be described. The delay-and-sum array is a process of providing predetermined delay to the observation signal of each microphone and obtaining the sum. In a time-frequency domain, the calculation is executed by Equation [6.2] using the steering vector S (ω, θ). When this equation is used, phases between the microphones are formed for the sound arriving from the direction θ. Therefore, Y (ω, t, θ) which is the result obtained by adding the phases enhances the sound from the direction θ.

The variance (the mean of the square of the absolute value) of Y (ω, t, θ) in the block can be calculated by Equation [6.3] and this equation is transformed like Equation [6.4] by Equation [2.2]. Equation [6.1] is the logarithm of Equation [6.4]. The reason for multiplying ½ is to erasing the square attached to the left side of Equation [6.3] and compare with the null beam forming pattern.

Y (ω, t, θ) of Equation [6.2] has a large absolute value when one of the directions of the sound sources included in the observation signal is identical to the value of θ. Therefore, Equation [6.1] calculated therefrom has the same characteristic as that of the directivity beam forming pattern.

6. Summary of Advantages

As described above, the following processes are devised in the speech section detection based on the sound source estimation in the sound signal processing apparatus of the present disclosure.

1. The direction points are detected using the directivity beam forming pattern as well as the null beam forming pattern.

2. The conditions for detecting the beginning of the utterance section and detecting the direction points by extension of the section are changed in the tracking of the direction points.

For example, the accuracy of the speech section detection is improved based on these processes.

Hitherto, the embodiments and the modified examples of the present technique have been described. However, it should be apparent for those skilled in the art that the modifications and substitutions of the embodiment can be made without departing from the gist of the embodiments of the present technique. That is, the embodiment should not construe since the embodiment has be disclosed as an example. The claims are considered to determine the gist of the embodiment of the present technique.

The above-described series of processes in the specification may be executed by hardware, software, or combination thereof. When the series of processes are executed by software, a program recording the processing sequence is installed and executed in a memory of a computer embedded in dedicated hardware or is installed and executed in a general personal computer capable of executing various kinds of processes by installing various kinds of programs. For example, the program may be stored in advance in a recording medium. Not only the program is installed from a recording medium to a computer, but also the program may be received from a recording medium via a network such as the LAN (Local Area Network) or the Internet and may be installed in a recording medium such as a hard disk or the like included in a computer.

The various kinds of processes described in the specification may be executed chronologically in accordance with the description and may be executed in parallel or individually in accordance with the processing capability of an apparatus executing the processes or if necessary. A system in the specification has a logical collective configuration of a plurality of apparatuses and is not limited to a configuration the apparatuses with each configuration are provided within the same casing.

The present disclosure contains subject matter related to that disclosed in Japanese Priority Patent Application JP 2011-008208 filed in the Japan Patent Office on Jan. 18, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound signal processing apparatus comprising:
one or more processors configured to:
detect one or more direction points indicating a sound source direction of a sound signal for each of a plurality of blocks divided in a predetermined time unit; and
connect the direction points to each other between the plurality of blocks and detect a section in which a sound is active,
wherein the detecting one or more direction points includes:
generating a null beam forming filter, which is a spatial filter with low sensitivity for the sound source direction, and a directivity beam forming filter, which is a spatial filter with high sensitivity for the sound source direction,
generating a null beam forming pattern which indicates correspondence relationship data between a direction and a gain and corresponds to the null beam forming filter, and
generating a directivity beam forming pattern which indicates correspondence relationship data between the direction and the gain and corresponds to the directivity beam forming filter,
wherein the one or more direction points which indicate the sound source direction are detected based on determining that a local minimum in the null beam forming pattern is below a predetermined threshold value, and a local maximum in the directivity beam forming pattern is present in proximity to the local minimum in the null beam forming pattern.

2. The sound signal processing apparatus according to claim 1, wherein the one or more processors are configured to calculate eigenvalues and eigenvectors through an eigenvalue decomposition process on a covariance matrix calculated for each block from an observation signal of the time-frequency domain generated from the sound signal, and generate the directivity beam forming filter using the eigenvector corresponding to a calculated maximum eigenvalue.

3. The sound signal processing apparatus according to claim 1, wherein the one or more processors are configured to calculate eigenvalues and eigenvectors through an eigenvalue decomposition process on a covariance matrix calculated for each block from an observation signal of the time-frequency domain generated from the sound signal, calculate a transformed matrix $V'(\omega)$ through a calculation process using a matrix $V(\omega)$ formed by the eigenvectors and a diagonal matrix $D(\omega)$ formed by the eigenvalues, and generate the null beam forming filter using any one of rows of the calculated transformed matrix $V'(\omega)$.

4. The sound signal processing apparatus according to claim 1, wherein the one or more processors are configured to determine whether the local minimum in the null beam forming pattern is selected as a direction point by applying a dynamic threshold value calculated based on the minimum value in the null beam forming pattern over neighboring blocks among the plurality of blocks from a new target block for the direction point detection process.

5. The sound signal processing apparatus according to claim 1, wherein the one or more processors are configured to:
distinguish between a strong direction point, which satisfies a predetermined condition that a value of the local minimum in the null beam forming pattern is less than a value of the local maximum in the corresponding directivity beam forming pattern, and a weak direction point, which does not satisfy the predetermined condition; and
select the weak direction point as the direction point indicating the sound source direction based on the presence of the weak direction point inside the section being generated.

6. The sound signal processing apparatus according to claim 1, wherein the one or more processors are configured to:
distinguish between a strong direction point, which satisfies a predetermined condition that a value of the local minimum in the null beam forming pattern is less than a value of the local maximum in the corresponding directivity beam forming pattern, and a weak direction point, which does not satisfy the predetermined condition;
select both the strong direction point and the weak direction point as the direction points indicating the sound source direction in a process of extending and defining the section being generated; and select the strong direction point as the direction point indicating the sound source direction in the beginning of a new section to be generated.

7. A sound signal processing method which is executed by a sound signal processing apparatus, comprising:

detecting one or more direction points indicating a sound source direction of a sound signal for each of a plurality of blocks divided in a predetermined time unit; and connecting the direction points to each other between the plurality of blocks and detecting a section in which sound is active, wherein the detection of the direction point includes:

generating a null beam forming filter, which is a spatial filter with low sensitivity for the sound source direction, and a directivity beam forming filter, which is a spatial filter with high sensitivity for the sound source direction, generating a null beam forming pattern which indicates correspondence relationship data between a direction and a gain and corresponds to the null beam forming filter, and generating a directivity beam forming pattern which indicates correspondence relationship data between the direction and the gain and corresponds to the directivity beam forming filter, wherein the one or more direction points which indicate the sound source direction are detected based on determining that a local minimum in the null beam forming pattern is below a predetermined threshold value, and a local maximum in the directivity beam forming pattern is present in proximity to the local minimum in the null beam forming pattern.

8. A non-transitory computer-readable medium including a program causing a sound signal processing apparatus to execute sound signal processing, comprising:

detecting one or more direction points indicating a sound source direction of a sound signal for each of a plurality of blocks divided in a predetermined time unit; and connecting the direction points to each other between the plurality of blocks and detecting a section in which sound is active, wherein the detection of the direction point includes:

generating a null beam forming filter, which is a spatial filter with low sensitivity for the sound source direction, and a directivity beam forming filter, which is a spatial filter with high sensitivity for the sound source direction, generating a null beam forming pattern which indicates correspondence relationship data between a direction and a gain and corresponds to the null beam forming filter, and generating a directivity beam forming pattern which indicates correspondence relationship data between the direction and the gain and corresponds to the directivity beam forming filter, wherein the one or more direction points which indicate the sound source direction are detected based on determining that a local minimum in the null beam forming pattern is below a predetermined threshold value, and a local maximum in the directivity beam forming pattern is present in proximity to the local minimum in the null beam forming pattern.

9. The sound signal processing apparatus according to claim 1, wherein the one or more processors are configured to detect the section in which the sound is active based on a comparison of a ratio of effective blocks with a predetermined value, the effective blocks including one or more blocks among the plurality of blocks having the detected one or more direction points, and wherein the ratio of effective blocks is calculated based on section information.

10. The sound signal processing apparatus according to claim 9, wherein the section information comprises a start block number, an end block number and a number of the effective blocks among the plurality of blocks.

* * * * *